(12) United States Patent
Posin et al.

(10) Patent No.: US 10,709,980 B2
(45) Date of Patent: Jul. 14, 2020

(54) WEB EXPLORER FOR GAMING PLATFORM INTERFACE

(71) Applicant: Sony Interactive Entertainment America LLC, San Mateo, CA (US)

(72) Inventors: David Posin, Aliso Viejo, CA (US); Anthony Nwokafor, Lake Forest, CA (US); Ari Schwartz, Santa Ana, CA (US); Dan Manez, Los Angeles, CA (US); Daniel Jordan, Laguna Niguel, CA (US); David Rivera, Aliso Viejo, CA (US); Joshua Kennedy, Aliso Viejo, CA (US); Kyle Neil Averack, Rancho Santa Margarita, CA (US); Nathanael Ferrero, Manchester, MI (US)

(73) Assignee: Sony Interactive Entertainment America LLC, San Mateo, CA (US)

( * ) Notice: Subject to any disclaimer, the term of this patent is extended or adjusted under 35 U.S.C. 154(b) by 297 days.

(21) Appl. No.: 15/094,879

(22) Filed: Apr. 8, 2016

(65) Prior Publication Data

US 2017/0189809 A1    Jul. 6, 2017

Related U.S. Application Data

(60) Provisional application No. 62/273,769, filed on Dec. 31, 2015.

(51) Int. Cl.
*A63F 13/537* (2014.01)
*G06F 16/951* (2019.01)
(Continued)

(52) U.S. Cl.
CPC ............ *A63F 13/537* (2014.09); *A63F 13/35* (2014.09); *G06F 16/332* (2019.01); *G06F 16/951* (2019.01)

(58) Field of Classification Search
CPC ...... A63F 13/537; A63F 13/35; G06F 16/332; G06F 16/951
(Continued)

(56) References Cited

U.S. PATENT DOCUMENTS

| | | | |
|---|---|---|---|
| 2002/0083148 A1* | 6/2002 | Shaw ................ | G06F 17/30902 709/214 |
| 2006/0048076 A1* | 3/2006 | Vronay ................ | G06F 3/0482 715/850 |

(Continued)

OTHER PUBLICATIONS

Gss-1987 et al: "Steam (software)"—Wikipedia, the free encyclopedia, Dec. 30, 2015 XP055344586, Retrieved from the internet: URL:https://en.wikipedia.org/w/index.php?title=Steam_(software)&oldid=697406985 [retrieved on Feb. 10, 2017] the whole document.

(Continued)

*Primary Examiner* — Jay Trent Liddle
*Assistant Examiner* — Ryan Hsu
(74) *Attorney, Agent, or Firm* — Penilla IP, APC

(57) ABSTRACT

A method is provided, including the following method operations: rendering, by a client device, game title icons in a gaming platform interface to a display device, the game title icons identifying video games that are accessible through the gaming platform interface using the client device; receiving, by the client device, user selection data indicating selection of a game title icon and identifying a corresponding video game for exploration of related Internet content; generating a search query based on the identified video game, transmitting the search query over the network to a search engine, and receiving results of the search query over the network from the search engine, the results identifying Internet content items related to the video game; generating preview images of at least some of the Internet
(Continued)

content items; rendering the preview images in association with the identified video game via the gaming platform interface.

19 Claims, 18 Drawing Sheets

(51) Int. Cl.
  *G06F 16/332* (2019.01)
  *A63F 13/35* (2014.01)
(58) Field of Classification Search
  USPC .......................................................... 463/31
  See application file for complete search history.

(56) References Cited

U.S. PATENT DOCUMENTS

| 2007/0072678 | A1* | 3/2007 | Dagres | G07F 17/32 |
| | | | | 463/42 |
| 2010/0083179 | A1* | 4/2010 | Decker | G06F 3/0483 |
| | | | | 715/830 |
| 2014/0179425 | A1* | 6/2014 | Perry | A63F 13/12 |
| | | | | 463/31 |
| 2014/0188925 | A1* | 7/2014 | Skolicki | H04N 21/4622 |
| | | | | 707/765 |

OTHER PUBLICATIONS

Anonymous:"Using REST to Invoke the API", Custom Search, Sep. 8, 2015 XP055345089, Retrieved from the internet: URL:http://web.archive.org/web/20150908112317/https://developers.google.com/custom-search/json-api/v1/using_rest [retrieved on Feb. 13, 2017] the whole document.

International Preliminary Report on Patentability (Form PCT/IB/373), dated Jul. 3, 2018, with Written Opinion of the International Searching Authority (Form PCT/ISA/237), issued in corresponding International Patent Application No. PCT/US2016/067869 (10 total pages).

* cited by examiner

Rate your participation level in these activities

Causal — Hardcore

- 1000
- 1002 Gaming
- 1004 Video/TV
- 1006 Music
- 1008 Socializing

OK

✕ Enter    ◯ Back    [OPTIONS] Options

FIG. 10

WEB EXPLORER FOR GAMING PLATFORM INTERFACE

CLAIM OF PRIORITY

This application claims priority to U.S. Provisional Application No. 62/273,769, filed Dec. 31, 2015, entitled "Web Explorer for Gaming Platform Interface, the disclosure of which is incorporated by reference herein.

BACKGROUND

Field of the Disclosure

The present disclosure relates to systems and methods for exploring web content through a gaming platform interface.

Description of the Related Art

A current area of rapidly growing technology is the field of cloud gaming. Users are able to access a number of games on a cloud gaming site over a network, such as the Internet, and begin interaction/playing the game. In order to select a game for game play, a user accesses his/her account on the cloud gaming site. The user is provided with a list of games that are available for the user account for game play.

It is within this context that embodiments of the disclosure arise.

SUMMARY OF THE DISCLOSURE

Embodiments of the present disclosure provide methods and systems that are used to provide for exploration of Internet content through a gaming platform interface.

In accordance with some implementations, a method is provided, comprising: sending, over a network to a client device, game title icons for inclusion in a gaming platform interface rendered to a display device, the game title icons identifying video games that are accessible through the gaming platform interface using the client device; receiving, over the network from the client device, user selection data indicating selection of a game title icon and identifying a corresponding video game for exploration of related Internet content; generating a search query based on the identified video game, transmitting the search query over the network to a search engine, and receiving results of the search query over the network from the search engine, the results identifying Internet content items related to the video game; generating preview images of at least some of the Internet content items; sending the preview images to the client device for rendering in association with the identified video game via the gaming platform interface.

In some implementations, the video games that are accessible through the gaming platform interface include cloud-executed video games that are accessible for interactive gameplay through the gaming platform interface, the interactive gameplay of a given cloud-executed video game including streaming of video content, generated from execution of the cloud-executed video game by a cloud-based game machine, to the client device for rendering to the display device, and further including processing of input data received from the client device to drive the execution of the cloud-executed video game.

In some implementations, generating and transmitting the search query includes accessing an application program interface (API) of the search engine.

In some implementations, the search query includes one or more keywords associated with the video game, the keywords including one or more of a title of the video game, a genre of the video game, a character of the video game, an object of the video game, a developer of the video game, a gameplay mechanic of the video game.

In some implementations, generating the preview image of a given Internet content item includes accessing a web server to retrieve the given Internet content item, generating a graphic rendering of the given Internet content item, and processing the graphic rendering of the Internet content item to generate the preview image.

In some implementations, the preview images are rendered as selectable preview icons, wherein selection of a rendered preview icon provides navigation to a corresponding Internet content item via the gaming platform interface.

In some implementations, rendering the preview icons in association with the identified video game includes arranging the preview icons in a grid configuration surrounding the game title icon of the identified video game.

In some implementations, the Internet content items include one or more of a web page, a video, or a social network feed.

In some implementations, the method further includes: filtering the results based on user preference data that identifies preferred Internet-related activities associated to a user account, the filtered results defining the at least some of the Internet content items for which preview images are generated.

In accordance with implementations of the disclosure, a method is provided, comprising: rendering, by a client device, game title icons in a gaming platform interface, to a display device, the game title icons identifying video games that are accessible through the gaming platform interface using the client device, wherein the video games that are accessible through the gaming platform interface include cloud-executed video games that are accessible for interactive gameplay through the gaming platform interface, the interactive gameplay of a given cloud-executed video game including streaming of video content, generated from execution of the cloud-executed video game by a cloud-based game machine, to the client device for rendering to the display device, and further including processing of input data received from the client device to drive the execution of the cloud-executed video game; receiving, by the client device, user selection data indicating selection of a game title icon and identifying a corresponding video game for exploration of related Internet content; generating a search query based on the identified video game, transmitting the search query over the network to a search engine, and receiving results of the search query over the network from the search engine, the results identifying Internet content items related to the video game; generating preview images of at least some of the Internet content items; rendering the preview images in association with the identified video game via the gaming platform interface.

In some implementations, generating and transmitting the search query includes accessing an application program interface (API) of the search engine.

In some implementations, the search query includes one or more keywords associated with the video game, the keywords including one or more of a title of the video game, a genre of the video game, a character of the video game, an object of the video game, a developer of the video game, a gameplay mechanic of the video game.

In some implementations, generating the preview image of a given Internet content item includes accessing a web server to retrieve the given Internet content item, generating a graphic rendering of the given Internet content item, and processing the graphic rendering of the Internet content item to generate the preview image.

In some implementations, the preview images are rendered as selectable preview icons, wherein selection of a rendered preview icon provides navigation to a corresponding Internet content item via the gaming platform interface.

In some implementations, rendering the preview icons in association with the identified video game includes arranging the preview icons in a grid configuration surrounding the game title icon of the identified video game.

In some implementations, the Internet content items include one or more of a web page, a video, or a social network feed.

In some implementations, the method further includes: filtering the results based on user preference data that identifies preferred Internet-related activities associated to a user account, the filtered results defining the at least some of the Internet content items for which preview images are generated.

In accordance with implementations of the disclosure, a method is provided, comprising: rendering, by a client device, icons in a gaming platform interface, to a display device, the icons identifying content items that are accessible through the gaming platform interface using the client device, wherein the content items that are accessible through the gaming platform interface include cloud-executed video games that are accessible for interactive gameplay through the gaming platform interface, the interactive gameplay of a given cloud-executed video game including streaming of video content, generated from execution of the cloud-executed video game by a cloud-based game machine, to the client device for rendering to the display device, and further including processing of input data received from the client device to drive the execution of the cloud-executed video game; receiving, by the client device, user selection data indicating selection of an icon and identifying a corresponding content item for exploration of related Internet content; generating a search query based on the identified content item, transmitting the search query over the network to a search engine, and receiving results of the search query over the network from the search engine, the results identifying Internet content items related to the identified content item; generating preview images of at least some of the Internet content items; rendering the preview images in association with the identified video game via the gaming platform interface.

In some implementations, the content items are selected from the group consisting of video games, videos, and music.

In some implementations, generating and transmitting the search query includes accessing an application program interface (API) of the search engine; wherein the search query includes one or more keywords associated with the content item, the keywords including one or more of a title of the video game, a genre of the video game, a character of the video game, an object of the video game, a developer of the video game, a gameplay mechanic of the video game.

Other aspects and advantages of the disclosure will become apparent from the following detailed description, taken in conjunction with the accompanying drawings, illustrating by way of example the principles of the disclosure.

BRIEF DESCRIPTION OF THE DRAWINGS

The disclosure, together with further advantages thereof, may best be understood by reference to the following description taken in conjunction with the accompanying drawings.

FIG. 10 illustrates an interface 1000 for setting user interests that will be utilized to determine appropriate Internet content to provide to the user, in accordance with implementations of the disclosure.

DETAILED DESCRIPTION

Figure 1A:
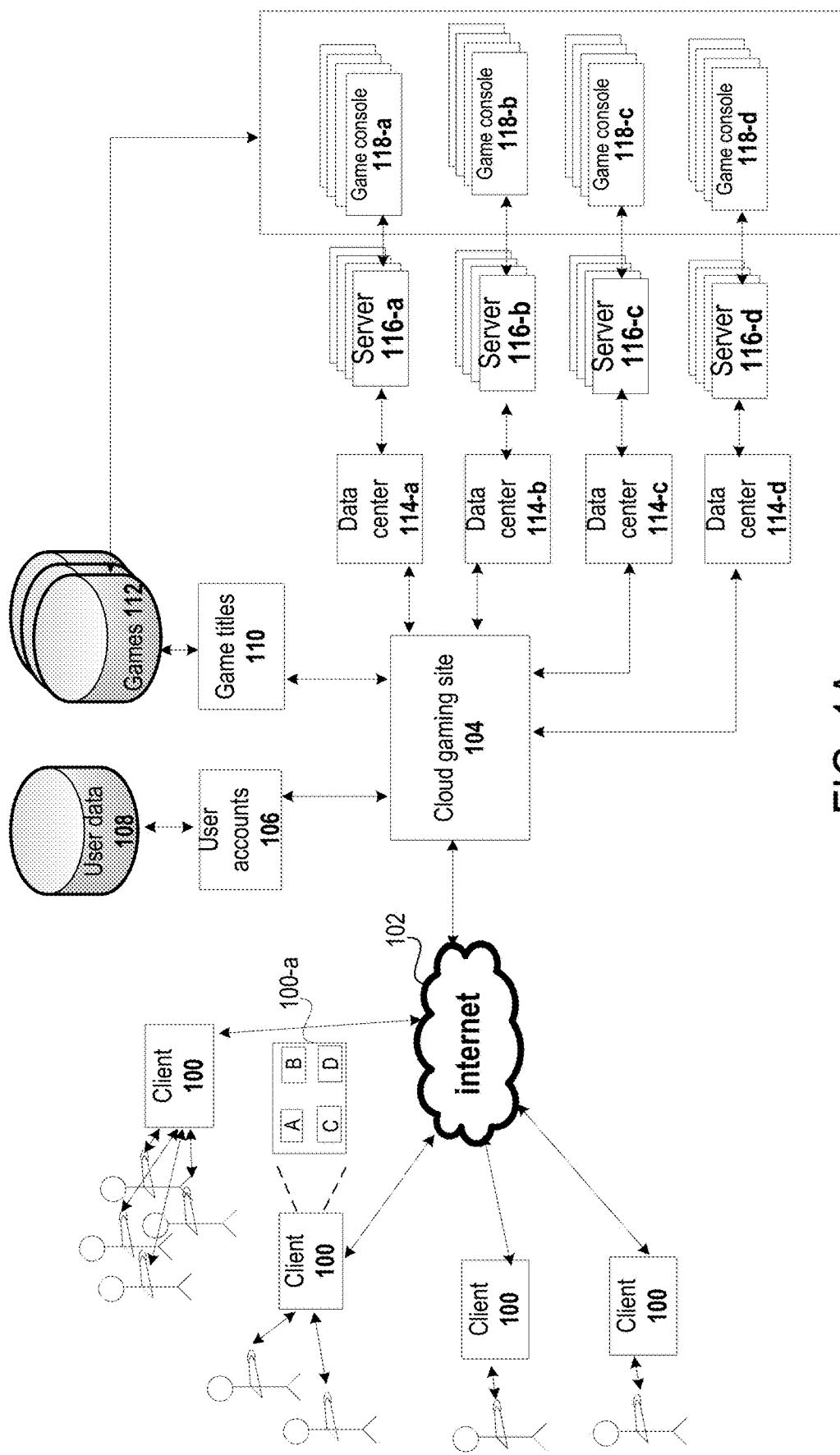
FIG. 1A illustrates a simplified block diagram of an exemplary system that is used to preload game content onto a cloud game server, in accordance with an embodiment of the present disclosure.

In the following description, numerous specific details are set forth in order to provide a thorough understanding of the present disclosure. It will be apparent, however, to one skilled in the art that the present disclosure may be practiced without some or all of these specific details. In other instances, well known process steps have not been described in detail in order not to obscure the present disclosure.

Implementations of the present disclosure provide for user exploration of web content through a gaming platform interface. The navigation mechanic for exploration of web content disclosed herein provides a graphically driven interface and an intuitive presentation and selection process that is optimized for gaming platform interfaces. In accordance with implementations described below, users may select a video game or other content to explore related Internet content. In response, the system presents preview icons that indicate Internet content that is accessible through the gaming platform interface. Users may access the Internet content or further explore a given piece of content.

Several operations are performed by a server(s) within a data center associated with a cloud gaming site when a user request is received for a game title. When the cloud gaming site receives a user request, a data center hosting the game associated with the selected game title is identified and the request is sent to the identified data center for instantiating the game for the selected game title. In response to the request, a server at the data center identifies the game code, loads the identified game code and initializes the files related to the game code in preparation for presenting the game content to a user. Game data associated with a game includes generic game data and user-specific game data. Therefore, initializing the files includes identifying, loading, and initializing generic game data and user-specific game data. Initializing generic game data may include initializing a graphics engine, installing graphics data, initializing sound files, installing art work, etc. Initializing user specific data may include locating and installing user data, user history, game history, etc. Loading of the generic game data may take anywhere from a few seconds to a few minutes depending on the complexity of the game/graphics of the game.

While the generic game data is being loaded and initialized, a "splash" screen may be provided for rendering at the client device. A splash screen may be designed to provide representative images of the game that is being loaded, to allow a user a preview of the type of game that is being loaded. Once the generic game data is loaded, the audio content may be rendered and a selection/navigation screen is presented for user selection/customization. User selection input provided at the selection/navigation screen may include game level selection, game icon(s) selection, game mode selection, game winnings, and other user-related data that may require uploading of additional game content. Uploading of user selection input can cause additional delay before the game content is made available to the user for game play. In some embodiments, game content is made available by streaming the game content from the game cloud system to a user's computing device for viewing and interacting. After loading user specific data, the game content is available for game play.

FIG. 1A illustrates an exemplary system used to load game files for a game available through a cloud gaming site. The system includes a plurality of client devices 100 that are communicatively connected to the cloud gaming site 104 over a network 102, such as the Internet. When a request to access the cloud gaming site 104 is received from a client device 100, the cloud gaming site 104 accesses user account information 106 stored in a user data store 108 to identify a user associated with a client device through which the request is initiated. In some embodiments, the cloud gaming site may also validate the identified user in order to determine all the games the user is authorized to view/play. Following user account identification/validation, the cloud gaming site accesses a game titles data store 110 to identify the game titles that are available at the game cloud site for the user account initiating the request. The game titles data store 110, in turn, interacts with a games database 112 to obtain the game titles for all the games that are available for the cloud gaming site. As new games are introduced, the games database 112 will be updated with the game code and the game titles data store 110 will be provided with game titles information for the newly introduced games. The client device from where the request is initiated may or may not be registered with the cloud gaming site, when the request was initiated. If the user of the client device initiating the request is not a registered user, then the cloud gaming site may identify the user as a new user and select the game titles (for e.g., a default set of game titles) that are appropriate for a new user. The identified game titles are returned to the client device for presenting on a display screen 100-a, as shown in FIG. 1A.

User interaction at one of the game titles rendered on the client device is detected and a signal is sent to the cloud gaming site. The signal includes the game title information where the user interaction was detected and the user interaction registered at the game title. In response to the signal received from the client device, the cloud gaming site proactively determines a data center where the game is being hosted and sends a signal to the identified data center to load the game associated with the game title for which the user interaction is detected. In some embodiments, more than one data center may be hosting the game. In such embodiments, the cloud gaming site may determine the geo location of the client device initiating the request and identify a data center that is geographically close to the client device and signal the data center to pre-load the game. The geo location of the user may be determined using a Global Position System (GPS) mechanism within the client device, the client's IP address, the client's ping information, to name a few. Of course, the aforementioned ways to detect the geo location of the user may be exemplary and other types of mechanisms or tools may be used to determine the geo location of the user. Identification of a data center that is close to the client device can minimize latency during user interaction with the game. In some embodiments, the identified data center may not have the required bandwidth/capacity to host the game or may be overused. In these embodiments, the cloud gaming site may identify a second data center that is geographically close to the client device. The loading of the game includes loading game code and executing an instance of the game.

In response to receiving the signal from the cloud gaming site, the identified data center may select a server at the data center to instantiate the game on the server. The server is selected based on the hardware/software capabilities available and the game requirements. The server may include a plurality of game consoles and the server may determine which one of the plurality of game consoles to use to load the game. The game console may be similar to an independent game console, or may be a rack-mounted server or a blade server. The blade server, in turn, may include a plurality of server blades with each blade having required circuitry for instantiating a single dedicated application, such as the game. Of course, the game console described above is exemplary and should not be considered restrictive. Other types of game consoles, including game stations, etc., and other forms of blade server may also be engaged for hosting the identified game.

Once the game console is identified, the generic game-related code for the game is loaded onto the game console and a signal is returned to the client device via the cloud gaming site over the network identifying the game console on which the game is instantiated. The loaded game is thus made available to the user.

Figure 1B:
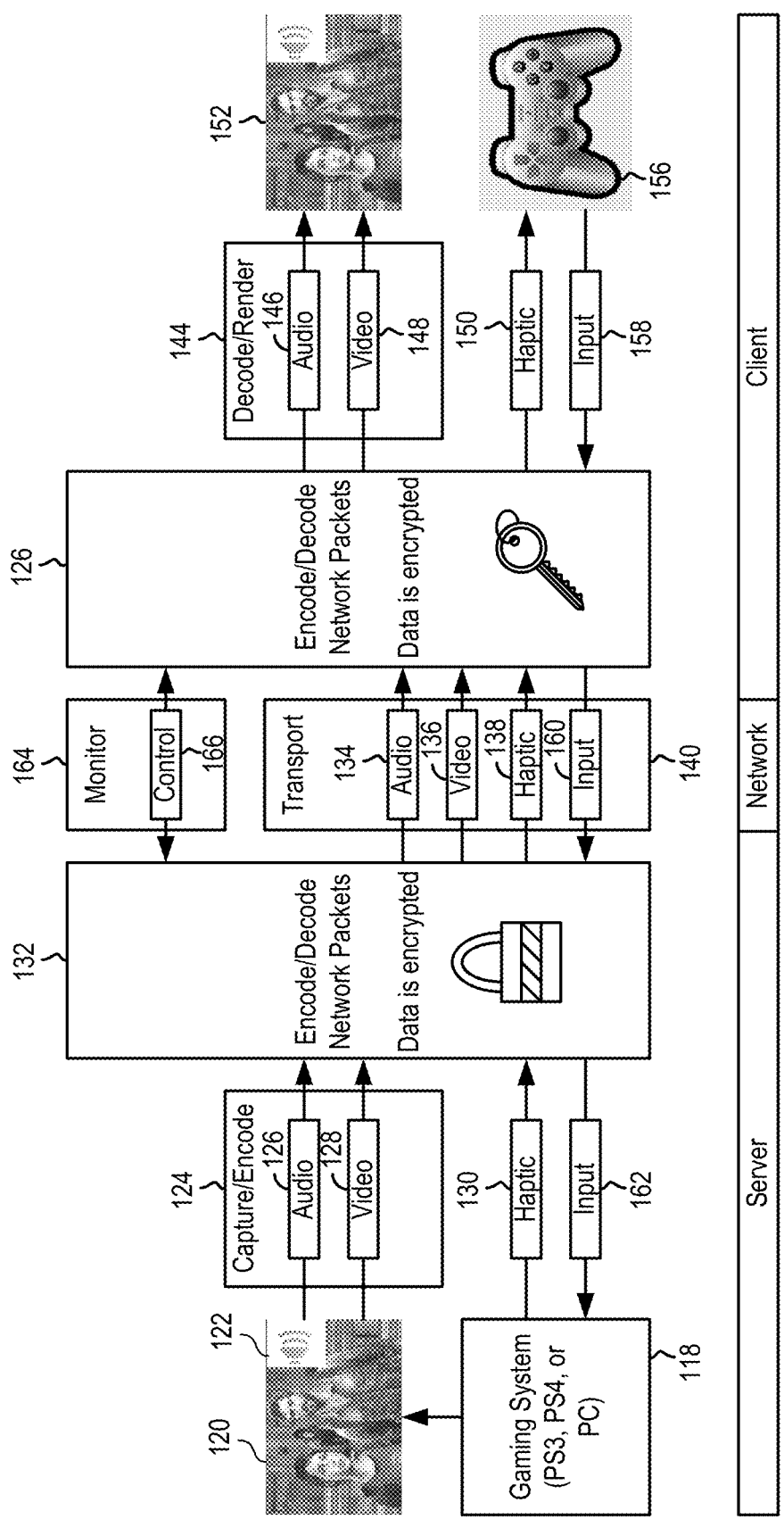
FIG. 1B is a flow diagram conceptually illustrating various operations which are performed for streaming a cloud video game to a client device, in accordance with implementations of the disclosure.

FIG. 1B is a flow diagram conceptually illustrating various operations which are performed for streaming a cloud video game to a client device, in accordance with implementations of the disclosure. The gaming system 118 executes a video game and generates raw (uncompressed) video 120 and audio 122. The video 120 and audio 122 are captured and encoded for streaming purposes, as indicated at reference 124 in the illustrated diagram. The encoding can provide for compression of the video and audio streams to reduce bandwidth usage and optimize the gaming experience. Examples of encoding formats include H.265/MPEG-H, H.264/MPEG-4, H.263/MPEG-4, H.262/MPEG-2, WMV, VP6/7/8/9, etc.

The encoded audio 126 and encoded video 128 are further packetized into network packets, as indicated at reference numeral 132, for purposes of transmission over a network such as the Internet. The network packet encoding process can also employ a data encryption process, thereby providing enhanced data security. In the illustrated implementation, audio packets 134 and video packets 136 are generated for transport over the network, as indicated at reference 140.

The gaming system 118 additionally generates haptic feedback data 130, which is also packetized into network packets for network transmission. In the illustrated implementation, haptic feedback packets 138 are generated for transport over the network, as further indicated at reference 140.

The foregoing operations of generating the raw video and audio and the haptic feedback data, encoding the video and audio, and packetizing the encoded audio/video and haptic feedback data for transport are performed on one or more servers which collectively define a cloud gaming service/system. As indicated at reference 140, the audio, video, and haptic feedback packets are transported over a network, such as and/or including the Internet. As indicated at reference 142, the audio packets 134, video packets 136, and haptic feedback packets 138, are decoded/reassembled by the client device to define encoded audio 146, encoded video 148, and haptic feedback data 150 at the client device. If the data has been encrypted, then the network packets are also decrypted. The encoded audio 146 and encoded video 148 are then decoded by the client device, as indicated at reference 144, to generate client-side raw audio and video data for rendering on a display device 152. The haptic feedback data 150 can be processed/communicated to produce a haptic feedback effect at a controller device 156 or other interface device through which haptic effects can be rendered. One example of a haptic effect is a vibration or rumble of the controller device 156.

It will be appreciated that a video game is responsive to user inputs, and thus, a similar procedural flow to that described above for transmission and processing of user input, but in the reverse direction from client device to server, can be performed. As shown, a user operating controller device 156 may generate input data 158. This input data 158 is packetized at the client device for transport over the network to the cloud gaming system. The input data packets 160 are unpacked and reassembled by the cloud gaming server to define input data 162 on the server-side. The input data 162 is fed to the gaming system 118, which processes the input data 162 to update the game state of the video game.

During transport (ref. 140) of the audio packets 134, video packets 136, and haptic feedback packets 138, the transmission of data over the network can be monitored to ensure the cloud game stream quality of service. For example, network conditions can be monitored as indicated by reference 164, including both upstream and downstream network bandwidth, and the game streaming can be adjusted in response to changes in available bandwidth. That is, the encoding and decoding of network packets can be controlled based on present network conditions, as indicated by reference 166.

Figure 2A:
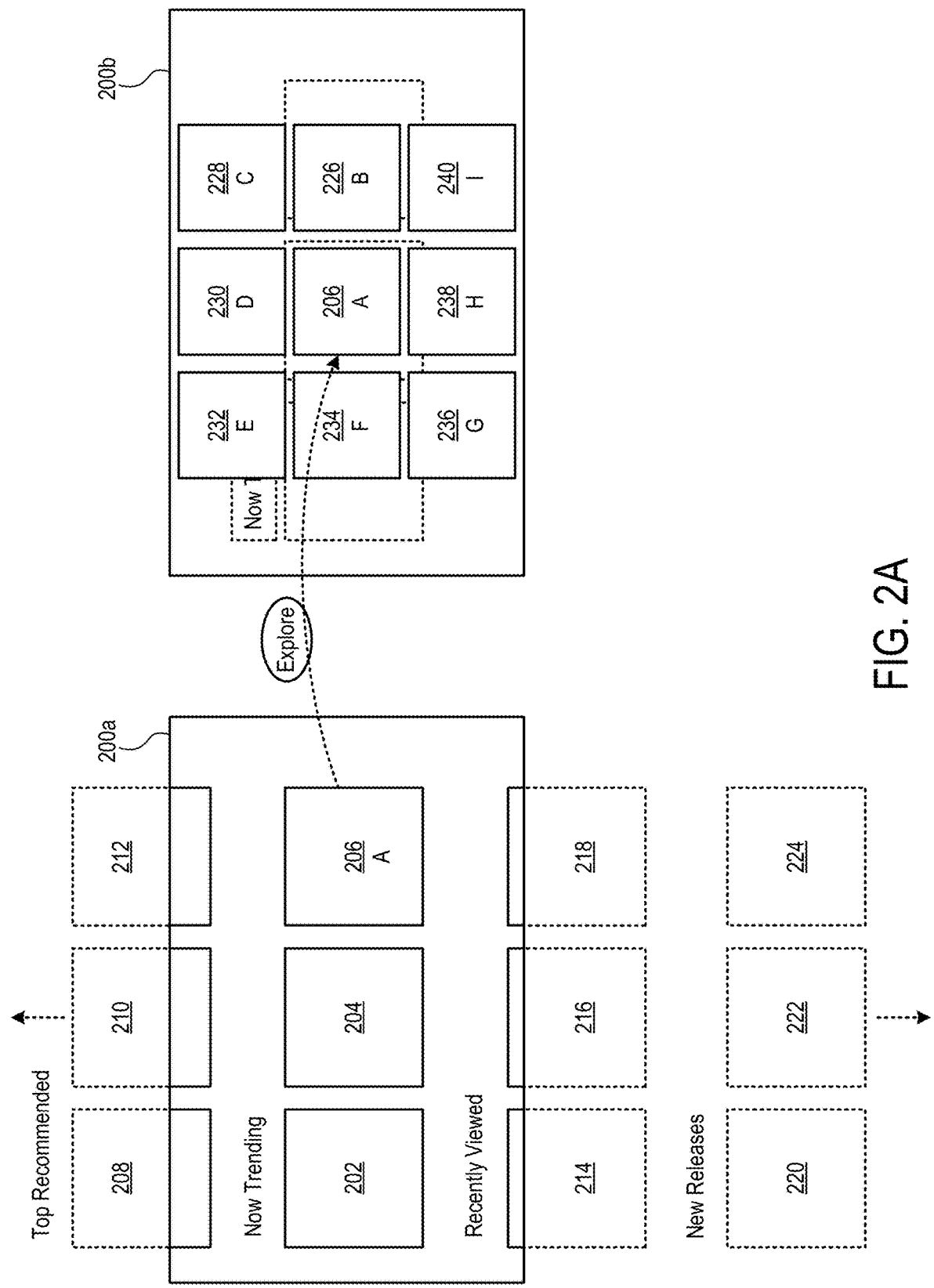
FIG. 2A illustrates views of a gaming platform interface, in accordance with implementations of the disclosure.

FIG. 2A illustrates views of a gaming platform interface, in accordance with implementations of the disclosure. For purposes of the present disclosure, a gaming platform interface will be understood as an interface that provides access to one or more video games for gameplay. A gaming platform interface can be rendered to a display device, and generally provides a graphical user interface (GUI) including graphical elements that aid in navigation and selection of specific video games. A gaming platform interface can be generated through execution by a computing device of executable code configured to generate the gaming platform interface. On dedicated gaming devices such as gaming consoles, portable gaming devices, arcade machines, special purpose gaming computers, etc., the gaming platform interface can be synonymous with the operating system of the dedicated gaming device. On other general purpose devices such as personal computers, laptop computers, server computers, tablet devices, smartphones, etc., a gaming platform interface may be generated through execution of a computer program by the general purpose device on top of the general purpose device's operating system.

It should be appreciated that a gaming platform interface can be generated locally by a local device, generated remotely by a remote device and transmitted to the local device (e.g. generated by a remote server computer and transmitted over a network to a local client device for rendering to a display), or generated through a combination of local and remote execution on local and remote devices, respectively. In still other implementations, a gaming platform interface can be defined through a web browser. That is, the web browser may access an online gaming system, and the gaming platform interface for the online gaming system can be dynamically rendered through the web browser over the Internet.

A gaming platform interface provides access to video games for gameplay by a user. In cloud gaming implementations, the gaming platform interface is rendered by a client device, and provides access to cloud-executed video games (a cloud video game is executed by a cloud gaming system and gameplay video is streamed to the client device, and input data is received by the cloud gaming system from the client device to drive the execution of the cloud video game). In some cloud gaming implementations, the gaming platform interface is generated by the cloud gaming system and dynamically served to the client device. In some implementations, the structure/format of the cloud gaming interface can be defined through local execution by the client device, while the specific elements to populate the structure/format of the cloud gaming interface are retrieved from the cloud gaming system.

In some implementations, the gaming platform interface provides login/authentication of a user to a user account, the user account having video games associated therewith. That is, the gaming platform interface can be specific for a given user account, with the specific content that is made available through the gaming platform interface being determined from data stored to the user account. For example, the user account may include data identifying specific video games that are accessible by the user, data identifying preferences and customizations of the gaming platform interface, etc. The user account may have various other gaming-related data stored in association therewith, such as saved game data, game preferences, trophies, achievements, game statistics, etc.

In some implementations, the gaming platform interface provides access to video games that are executed locally, for example by a dedicated gaming device such as a gaming console. The executable code for a given video game may be stored on a storage device of the local gaming device, such as a hard drive or solid state drive (SSD), on computer-readable media such as an optical disc such as a Blu-ray Disc™, on a removable flash drive, etc. It will be appreciated that a gaming platform interface may provide access to both locally-executed video games and cloud-executed video games. Examples of existing gaming platform interfaces executed on gaming consoles include the PlayStation® 4 user interface, the PlayStation® Network user interface, and the XrossMediaBar™ (XMB) user interface.

With continued reference to FIG. 2A, a view 200a of a gaming platform interface is shown. The view 200a is a rendered portion of a gaming platform interface as would be presented on a display device for interaction therewith. In the illustrated implementation, the view 200a includes icons 200, 202, and 204. The icons are configured to identify content that is accessible through the gaming platform interface. In some implementations, the icons 200, 202, and 204 are game title icons that identify video games that are available for gameplay (or purchase, preview, sampling, etc.). In other implementations, the icons can identify other types of content such as videos, photos, music/audio content, apps, web content, or any other type of content accessible through the gaming platform interface. For purposes of explanation of an example in accordance with implementations of the disclosure, the icons 200, 202, and 204 will be considered as a game title icons that identify video games, with the icon 200 specifically identifying a video game "A."

The icons 200, 202, and 204 identify video games in a "Now Trending" section of the gaming platform interface. The "Now Trending" section identifies video games that are popular or increasing in popularity, as determined from metrics associated with the video games (e.g. sales of a given video game, sales within a recent time period, number of users, growth in the number of users, number of users engaged in gameplay, growth in the number of users engaged in gameplay, social media activity related to the video game, etc.).

The gaming platform interface may include additional sections as shown in the illustrated implementation. For example, a "Recently Viewed" section may contain icons 214, 216, and 218 which identify video games or other content that have been recently played or viewed by the user. As indicated by the dashed lines in the illustrated figure, portions of the icons 214, 216, and 218 are not currently within the view 200a of the gaming platform interface. However, they may be revealed by vertically scrolling the view of the interface so as to bring the icons 214, 216, and 218 fully into view. Scrolling can be accomplished in various ways depending upon the particular device on which the gaming platform interface is being presented. For example, the user may operate an input device (e.g. joystick, button, trackpad, directional pad, trigger, etc.) on a controller device to effect scrolling of the interface. In some implementations, the controller device may be a motion controller, in which case scrolling can be effected by moving or positioning the motion controller in a prescribed manner (e.g. pointing or moving the motion controller in an up or down direction to effect scrolling up or down, respectively). In some implementations, the gaming platform interface is presented on a touchscreen display, and scrolling of the interface view can be effected by gestures detected through the touchscreen display (e.g. swiping up or down to cause scrolling up or down).

A "New Releases" section includes icons 220, 222, and 224 which identify video games or other content items that have been recently released or made available for gameplay or playback through the gaming platform interface (e.g. released or made available within a predefined time period of the current date/time). As noted above, the current view 200a of the gaming platform interface can be scrolled to reveal the "New Releases" section and the icons 220, 222, and 224.

A "Top Recommended" section includes icons 208, 210, and 212 which identify video games or other content items that have been recommended for the user. In various implementations, the recommendation of video games or content to the user can be based on a variety of factors, including without limitation, user preferences, user gameplay, game titles owned by the user, video game titles recently played by the user, other types of content recently viewed/accessed by the user, etc. in the illustrated implementation, portions of the icons 208, 210, and 212 are not shown in the view 200a, but can be revealed by scrolling the view.

Now considering game title icon 206 and its corresponding video game, the game title icon 206 may be selected to initiate gameplay of the video game. However, in accordance with implementations of the disclosure, the game title icon 206 may also be selected to explore Internet content related to the video game. When the game title icon 206 is selected, the user can be presented with options to play the video game, or explore Internet content related to the video game. If the user opts to play the video game, then the video game is loaded for gameplay (e.g. either locally or by a cloud gaming system). If the user opts to explore related Internet content, then the gaming platform interface provides additional icons identifying related content, as illustrated by the view 200b of the gaming platform interface.

The view 200b illustrates a web explorer interface, as part of the gaming platform interface, including several icons 206, 226, 228, 230, 232, 234, 236, 238, and 240. The web explorer interface can be visually presented as an overlay on top of the prior navigation point in the gaming platform interface. In the illustrated implementation, icons of the web explorer interface are overlaid on top of the previously shown "Now Trending" section, which is now visually in the background. The game title icon 206 shown in the view 200b corresponds to the icon 206 shown in the view 200a, and identifies the video game for which related Internet content is being explored. In the illustrated implementation, the game title icon 206 is positioned in a center location, whereas the other icons are positioned in a grid configuration surrounding the game title icon 206 in the center location.

The icons 226, 228, 230, 232, 234, 236, 238, and 240 each identify Internet content that relates to the video game. In accordance with implementations of the disclosure as discussed in further detail below, the Internet content can be determined by performing an Internet search using an Internet search engine, the search being defined based on information related to the video game. The results of the Internet search can be filtered based on user preferences, and preview images of content identified by the filtered results can be generated. The preview images can be presented via the icons to give the user an indication of the content identified by a given icon.

The Internet content that may be referenced or made accessible through the web explorer functionality of the gaming platform interface can include any type of content that is accessible over the Internet. By way of example without limitation, the Internet content may thus include web pages/sites (e.g. social networking sites, news sites, gaming sites, blogs, corporate sites, streaming content sites (e.g. video sharing sites), shopping/retail sites, digital media sites, etc.) or any sub-portion of a website/webpage or resource/document/file referenced or included therein, videos, images, graphics, text, audio, documents, etc. or any other type of content that is accessible over the Internet and capable of being rendered to the user by the user's local device(s).

Figure 2B:
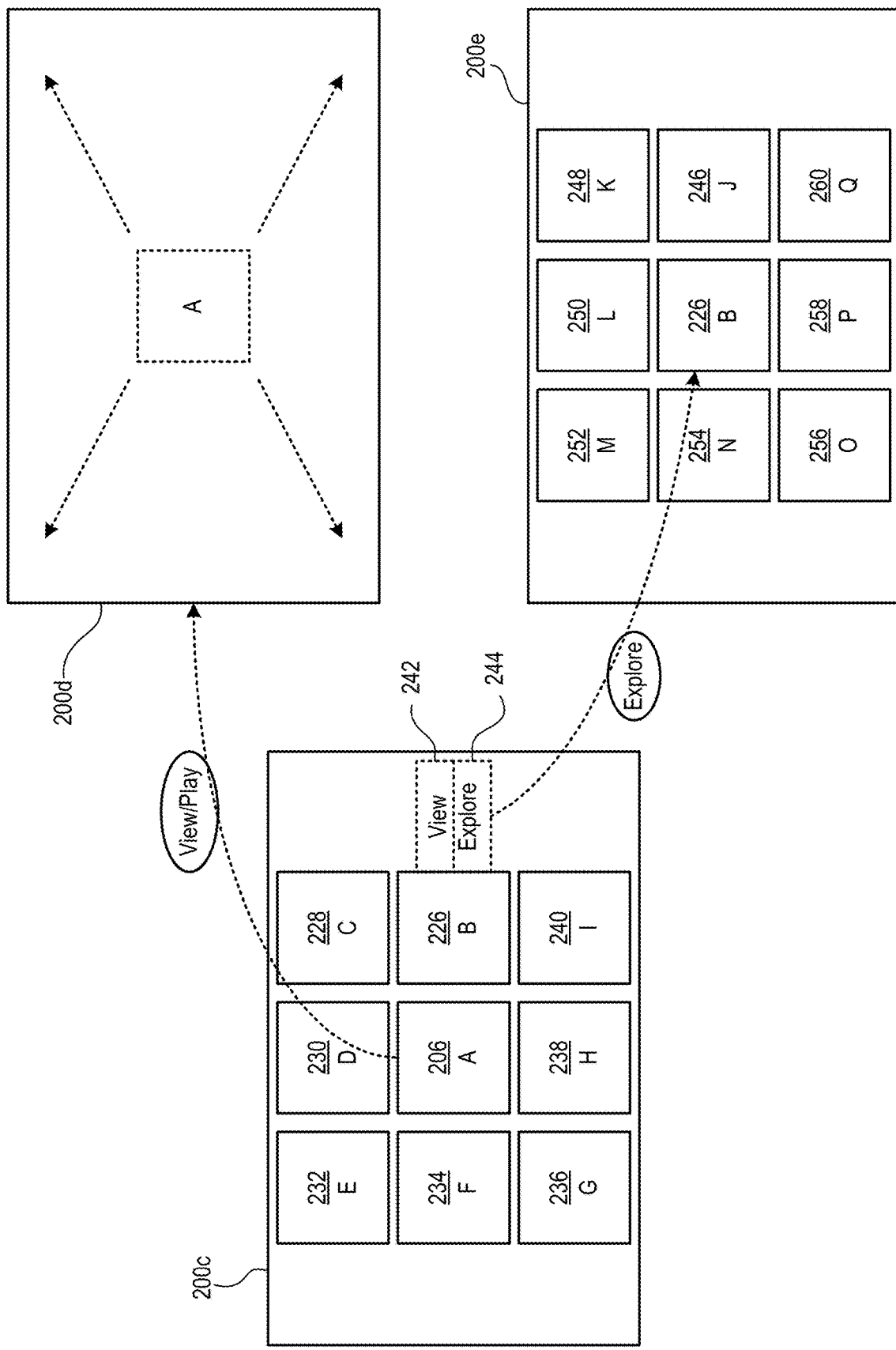
FIG. 2B illustrates further views of the gaming platform interface, in accordance with implementations of the disclosure.

FIG. 2B illustrates further views of the gaming platform interface, in accordance with implementations of the disclosure. A view 200c is shown, which illustrates examples of possible actions continuing from the view 200b previously shown. For example, the game title icon 206 may be selected for gameplay, resulting in loading of the corresponding video game "A" for interactive gameplay by the user. As noted, in some implementations, the video game "A" may be a cloud-based video game resulting in loading of the video game "A" by a cloud gaming system, whereas in other implementations, the video game "A" may be loaded locally for gameplay. In either case, the selection of icon 206 for gameplay results in loading of the video game for gameplay, and a resultant view 200d, wherein the gameplay video content produced by execution of the video game is rendered. As shown, the view of the gameplay video content of the video game replaces the view of the gaming platform interface. In some implementations, such as wherein the gaming platform interface is presented through a window in an operating system environment of a computer, the selection of the icon 206 for gameplay results in a full screen presentation of the gameplay video content, whereas in other implementations the gameplay video content is presented in the same window as the gaming platform interface.

It will be appreciated that navigation of the gaming platform interface may be indicated to the user through a variety of mechanisms, in accordance with various implementations of the disclosure. For example, a given icon may be indicated as being the active icon in the display through visual indication such as highlighting of the given icon, rendering of the given icon in a larger size than other icons, rendering of the given icon in greater color saturation/brightness than other icons, display of a selection indicator in association with the given icon (e.g. a box, outline, arrow, pointer, etc.), etc.

The icon 226 is configured to present a preview image of corresponding Internet content "B" which is accessible through the icon 226. In some implementations, selection of the icon 236 can provide access to a menu of options, including an option to view the corresponding Internet content (shown at reference 242) and an option to explore Internet content related to that corresponding to the icon 226 (shown at reference 244). When the option 242 is selected, then the Internet content corresponding to the icon 226 (which by way of example may be a webpage/site) can be rendered through the gaming platform interface. In some implementations, the corresponding Internet content is rendered within the context of the gaming platform interface (e.g. as an overlay on top of the existing gaming platform interface view). In some implementations, the corresponding Internet content is rendered through a separate program or browser (which may be activated from the gaming platform interface as a result of the selection to view the corresponding Internet content).

The option 244 allows the user to further explore related Internet content. When the option 244 is selected, then Internet content related to the content "B" corresponding to the icon 226 is retrieved and presented, as shown by the view 200e of the gaming platform interface. As illustrated in the view 200e, the icon 226 is now shifted to the center position in the view, with icons 246, 248, 250, 252, 254, 256, 258 and 260 surrounding the icon 226 and aligned along a grid pattern layout. The icons 246, 248, 250, 252, 254, 256, 258, and 260 are each selectable to view corresponding Internet content, or for further exploration of related Internet content. It will be appreciated that the process for retrieval of the related Internet content and generation of the icons 246, 248, 250, 252, 254, 256, 258, and 260 can be similar to that described above with respect to the game title icon 206, and may entail performance of an Internet search for Internet content related to the content "B" carried out by an Internet search engine. Results of the Internet search can be filtered according to various parameters including user preferences, interests, demographics, etc., and previews of the related Internet content can be generated and applied to define the icons.

In some implementations, some or all of the icons 246, 248, 250, 252, 254, 256, 258, and 260 can be derived from links or references in the corresponding Internet content of the icon 226. The Internet content corresponding to icon 226 can be scanned for links or references to other content, and such links/references can be accessed to generate graphic previews for display on the icons, wherein selection of an icon provides access to content from a corresponding link/reference.

It will be appreciated that in the above-described implementation, reference has been made to game title icons specifically for purposes of describing a certain implementations. However, it should be appreciated that in other implementations, any of such icons can represent other types of content, including without limitation, video content, audio content, Internet content, or any other type of content accessible through the gaming platform interface as discussed in the present disclosure. For purposes of brevity, all such implementations are not described herein in detail, but will be apparent to those skilled in the art in view of the present disclosure, and the interface mechanisms of the present disclosure that provide for viewing/playing/accessing content and for exploration of related Internet content shall apply equally to such implementations.

The gaming platform interface described herein thus provides an intuitive mechanism whereby a user may easily explore Internet content related to a video game or other content that is accessible or presented through a gaming platform interface. The presentation and navigation of Internet content through a gaming platform interface is often difficult for a user, as the user typically is not interfacing with a gaming platform interface using a keyboard and mouse or other conventional setup for web browsing. Instead, the user may utilize a controller device without a keyboard, so that text entry or movement of a pointer is cumbersome and difficult. However, implementations of the present disclosure provide for an interface mechanic that allows the user to graphically and intuitively explore Internet content. The Internet content can be related to an existing video game or other content that is accessible through the gaming platform interface. The user is thus quickly able to access new content that is related to their existing content.

Figure 3:
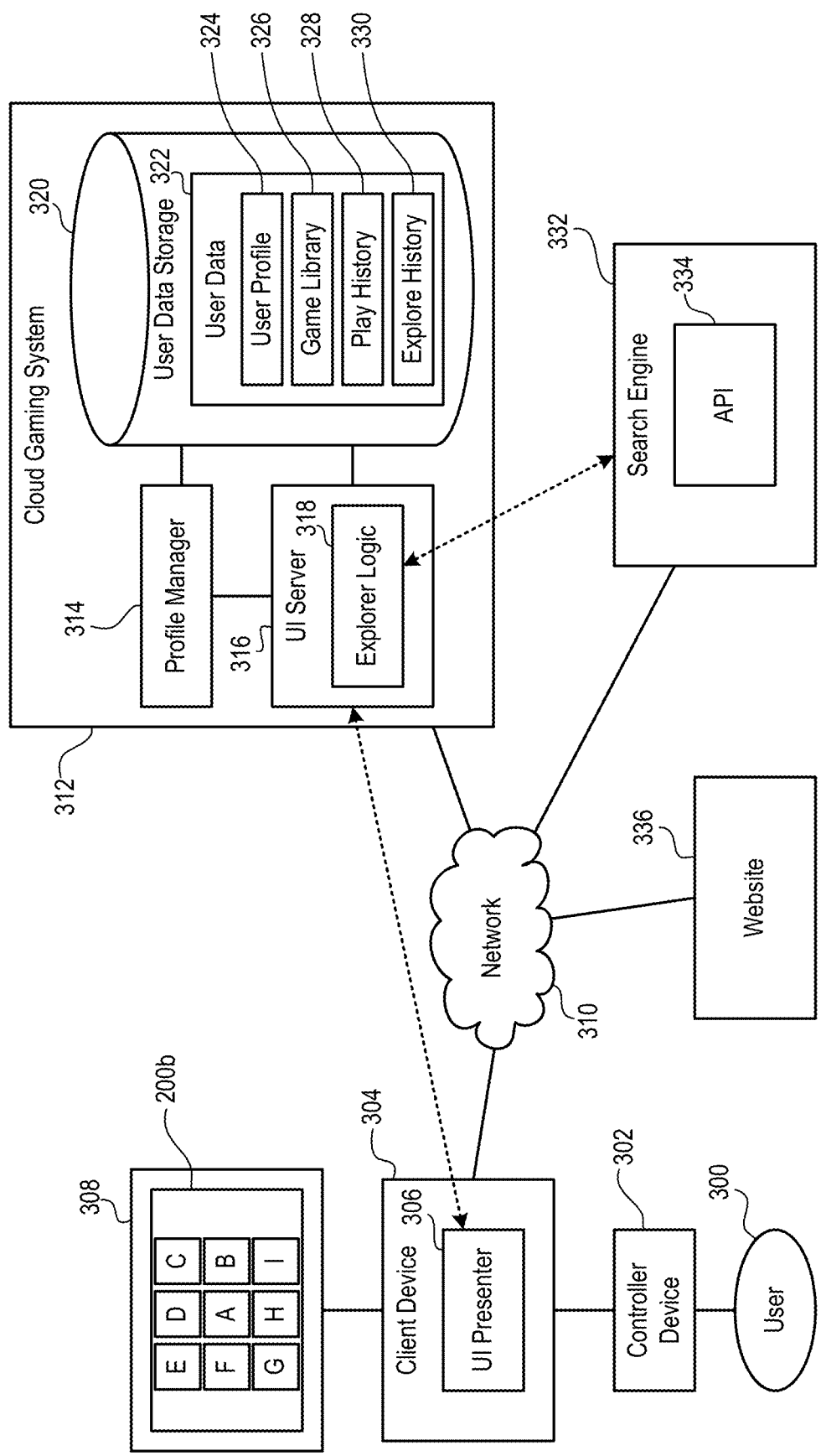
FIG. 3 illustrates a system for exploring Internet content through a gaming platform interface, in accordance with implementations of the disclosure.

FIG. 3 illustrates a system for exploring Internet content through a gaming platform interface, in accordance with implementations of the disclosure. A user 300 operates a controller device 302 that supplies input to a client device 304. The client device 304 communicates over a network 310 with a cloud gaming system 312. It will be appreciated that that client device 304 can be any type of computing device configured to render video game content to a display 308, including without limitation, a gaming console, set-top box, thin client, personal computer, etc. The display 308 can be any type of device capable of visually rendering video game content, including without limitation, a television, monitor, LCD/LED display, projector, etc. In some implementations, the functionality of the client device 304 and display 308 are integrated into a single device, as in a laptop computer, tablet, smartphone, portable gaming device, etc.

The client device 304 communicates with the cloud gaming system 312 to provide the gaming platform interface as described herein. It should be appreciated that the cloud gaming system 312 includes at least one server computer for carrying out the functionality described herein as being performed by the cloud gaming system or subcomponents thereof. The cloud gaming system 312 in some implementations includes a game machine configured to execute a video game and stream the gameplay video content over the network 310 to the client device 304 for rendering to the display 308. In such implementations, the cloud gaming system receives input data from the client device 304 (e.g. processed from input generated by the controller device 302), and the input data is applied to drive the execution of the video game by the cloud gaming system. However, in other implementations, a video game may be executed at the client device 304, though aspects of the gaming platform interface relating to the video game as described herein may be carried out in conjunction with the cloud gaming system via communications over the network 310.

The cloud gaming system includes a user interface (UI) server 316 that is configured to supply data for presentation via a gaming platform interface. The UI server 316 communicates data (e.g. including icon/preview image data) to a UI presenter 306 of the client device 304, the UI presenter 306 being configured to present such data to the display 308 as part of the gaming platform interface. The UI presenter 306 can include templates for formatting data for presentation. For example, templates for presentation of icons in a grid arrangement can be included. The templates may have predefined locations for icons, and in some implementations, the predefined locations may be configured for specific types of icons or for specific corresponding content.

The cloud gaming system 312 further includes a user data storage 320 that stores user data for users of the cloud gaming system 312, such as user data 322 corresponding to the user 300. The user data 322 can include various types of data specific to the user 300 that are pertinent to gaming and/or exploration of related Internet content. By way of example, the user data can include user profile data 324 of the user, including demographic information, preferences, interests, and other data defining a profile of the user 300. It will be appreciated that preferences and interests of the user can be determined from surveying the user, but may also be inferred from analysis of the user's activity on the cloud gaming system 312, including the user's gaming activity and exploration activity of Internet content in accordance with implementations of the disclosure. To this end, a profile manager 314 is included in the cloud gaming system, the profile manager 314 being configured to manage and update the user profile data 324.

Game library data 326 identifies the video games that are accessible to the user 300, which may include cloud video games as well as video games that are executed by the user's client device 304. Play history data 328 identifies the user's gameplay history, and may include various types of information relating to the user's gameplay activity, including by way of example without limitation, games played, gameplay session start and end times, total amount of gameplay time for a given video game, game achievements, etc. Explore history data 330 includes information about the user's exploration of Internet content utilizing the gaming platform interface, in accordance with implementations described herein. The explore history data 330 may include data identifying video games or other content that were explored by the user 300, data identifying content that was rendered utilizing the gaming platform interface when utilizing the web explorer functionality, links or references that were accessed by the user, etc.

The UI server 316 may access the user data storage 320 to retrieve any of the user data 322 for purposes of supplying data to the UI presenter 306 for inclusion in the gaming platform interface rendered to the display 308 for presentation to the user 300. For example, in order to present the user's game titles through the gaming platform interface, the UI presenter 306 may issue a request to the UI server for game titles from the user's game library, and the UI server 316 may retrieve data identifying the user's game titles from the game library data 326, and serve the data to the UI presenter 306. The data may identify the user's game titles and/or may include game title icons representative of the user's game titles which may be selectable to initiate gameplay/exploration, by way of example. The specific icons for presentation can be retrieved by the UI server 316 and served to the client device 304; and in some implementations, the icons can be cached at the client device 304 for future use.

It will be appreciated that a similar retrieval process can be performed by the UI server 316 to provide for any of the other presentations of icons as disclosed herein. For example, the UI server may retrieve and serve data identifying games/content and/or icons for the "Top Recommended," "Now Trending," "Recently Viewed," and "New Releases" sections as described above with reference to FIG. 2A. It will be appreciated that the data retrieved can be filtered according to the user profile data 324 so as to provide a tailored presentation for the user 300.

With continued reference to FIG. 2B, the UI server 316 further includes explorer logic 318 that is configured to respond to requests from the client device 304 to explore Internet content related to a given content item presented through the gaming platform interface. The explorer logic 318 can be configured to perform or facilitate any of the methods for exploring related Internet content discussed in the present disclosure. The explorer logic may receive a request to explore Internet content related to a given content item, and may generate a search query based on the given content item. The search query may be configured to access an API 334 of an Internet search engine 332. The search query is transmitted over the network 310 to the Internet search engine 332, and results from execution of the search query by the Internet search engine 332 are returned to the explorer logic 318. The results identify Internet content that is related to the content item for which exploration of related Internet content was requested. The results can be filtered according to user preferences/interests (e.g. utilizing the user profile data 324 retrieved from the user data storage 320), and processed to generate preview images of the Internet content identified by the filtered results. Generation of a preview images may entail retrieval of content identified by one of the search results from a website 336. For example, the search result may be a link or reference (e.g. to the website 336), and the content may be retrieved by accessing the link or reference over the network.

Though in the above description, the explorer logic 318 is defined as part of the UI server 316, in other implementations, the explorer logic 318 can be defined as part of the client device 306. Furthermore, in some implementations, the user data storage 320 may also be defined as part of the client device 306.

Figure 4:
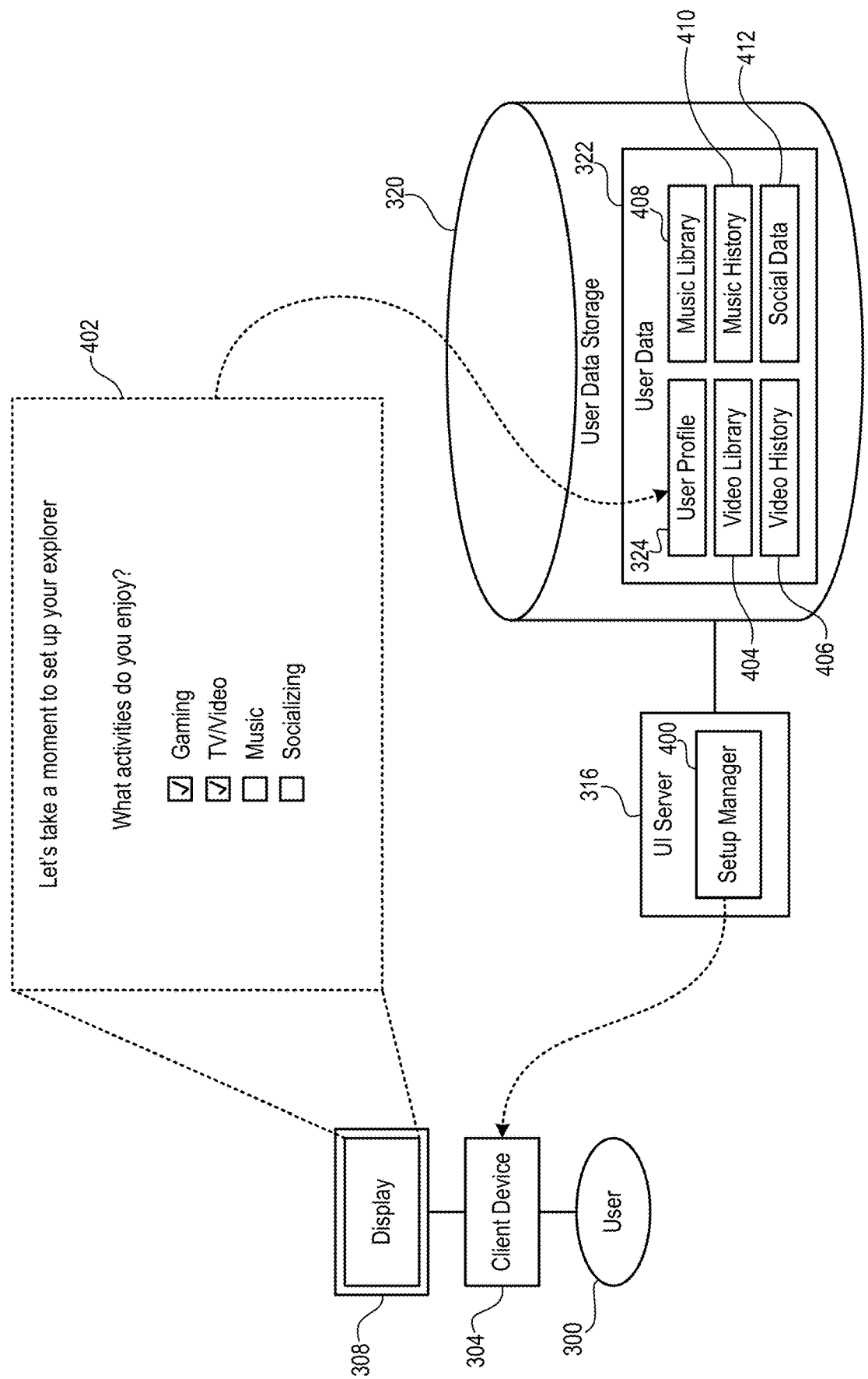
FIG. 4 illustrates a system for configuring a user's preferences for use with web explorer functionality, in accordance with implementations of the disclosure.

FIG. 4 illustrates a system for configuring a user's preferences for use with web explorer functionality, in accordance with implementations of the disclosure. In the illustrated implementation, the configuration shown is similar to the implementation described with reference to FIG. 3, and further defines a setup manager 400 included in the UI server 316. The setup manager 400 is configured to provide to the client device 304 an interface form 402 for rendering to the display 308. The interface form 402 as shown provides options for the user to indicate preferred activities, including without limitation, gaming, TV/video, music, and socializing. The user may select (e.g. by activating checkboxes as shown) any of these options to indicate their preferred activities. Data identifying the selected options is returned to the setup manager 400, and the data is stored as part of the user profile data 324. The user's preferences can be utilized to filter search results that are generated in response to a request to explore Internet content via the gaming platform interface, so as to provide through the gaming platform interface Internet content that is more likely to be relevant to the user.

Though in the above-described implementation the setup manager 400 is defined at the UI server 316, in other implementations, the setup manager 400 may be defined at the client device 304.

With continued reference to FIG. 4, additional types of data are shown as part of the user data 322. Video library data 404 includes data identifying video content that is accessible to the user 300. In some implementations, the video library data 404 can include the video content itself as well (e.g. in the form of digital video files). Video history data 406 includes data identifying the user's viewing history of video content through the gaming platform interface. This can include identification of the videos watched, when they were watched, the number of times they were watched, from what devices they were watched, user ratings, etc. Music library data 408 includes data identifying music content that is accessible to the user through the gaming platform interface. In some implementations, the music library data 408 may also include the music content itself (e.g. in the form of digital music files). Music history data 410 includes data identifying the user's listening history of music content through the gaming platform interface. This can include identification of the music played, when it was played, the number of times it was played, from what devices it was played, user ratings, etc.

Furthermore, the user data 322 can include social data 412, which includes data identifying activity and information related to at least one social network. The social network can be a gaming-specific social network formed from users of the gaming platform interface. The social network can also be a third-party social network, whose data can be accessed from the gaming platform interface, e.g. through an API of the social network. The social data 412 can include social graph data that identifies other users who are members of the primary user's social graph for a particular social network. The social data 412 can further include data identifying user activity on the social network (or activity identifying the user on the social network), such as posts/shares to the social network, endorsements of other posts/shares on the social network, chat activity, private messaging, apps installed for the user's account on the social network, etc.

It will be appreciated that the aforementioned video library data 404, video history data 406, music library data 408, music history data 410, and social data 412 can be analyzed by the profile manager 314 (shown at FIG. 3) to determine the user profile data 324, including determining the user's interests.

Figure 5:
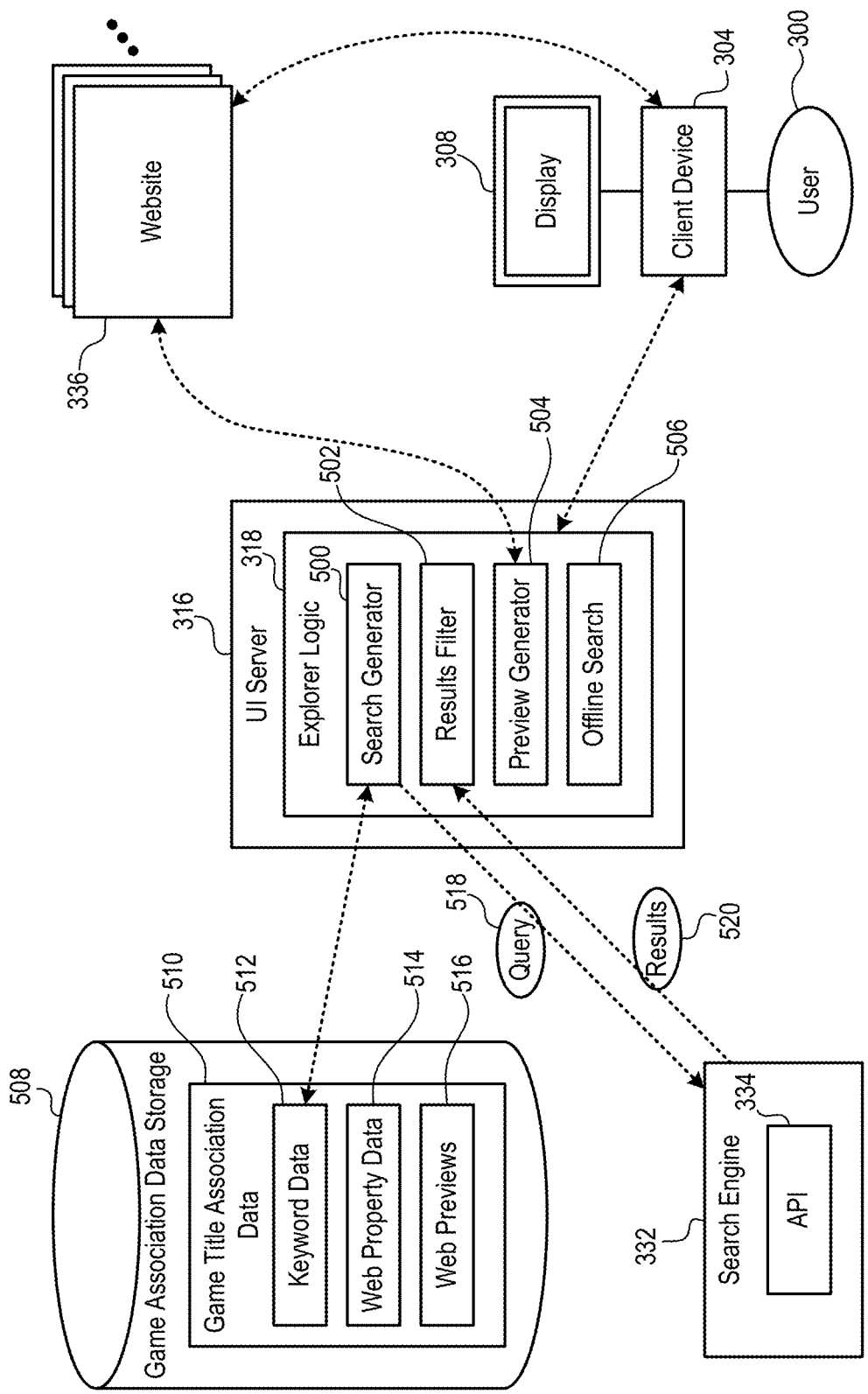
FIG. 5 illustrates a system for providing web explorer functionality through a gaming platform interface, in accordance with implementations of the disclosure.

FIG. 5 illustrates a system for providing web explorer functionality through a gaming platform interface, in accordance with implementations of the disclosure. The illustrated implementation provides additional components and details in accordance with the implementation described with reference to FIG. 3. As shown, the explorer logic 318 includes a search generator 500 that is configured to generate a search query 518 based on a selected content item, such as a video game title or other content presented or accessible through the gaming platform interface.

For purposes of describing a particular implementation, considering an implementation wherein related Internet content is requested based on a video game title, the search generator 500 may retrieve data relevant for constructing the search query 518 from a game association data storage 508. The game association data storage 508 includes game title association data 510 for a given video game title. The game title association data 510 includes information that is associated with the video game title and which may be utilized to form the search query. By way of example, the game title association data 510 may include keyword data 512 that includes keywords related to the video game title. Examples of keywords include, without limitation, the title of the video game, genre, style, characters/objects in the video game, game development company, actors, voice actors, setting of the video game (e.g. geographical, historical/temporal, etc.), gameplay mechanic of the video game (e.g. first-person shooter, simulator, racing, real-time strategy, etc.), or any other keywords that are relevant to the video game and to the exploration of related Internet content.

The search generator 500 thus retrieves keyword data 512 from the game association data storage and applies the keyword data to construct a search query 518. The search query 518 is transmitted to the search engine 332, and accesses the API 334 of the search engine 332. The search engine 334 performs an Internet search based on the query 518 and returns search results 520 to the explorer logic 318. The search results 520 can be filtered by a results filter 502, for example, based on the user profile data 324, which may include user preferences and interests. The results filter 502 may also filter the results based on other types of information, such as the user's web explorer history, popular results for similar searches or the same search (e.g. as determined from user selection/access (via the gaming platform interface) of the content identified by the result), date, time of day, social activity by the user, etc.

A preview generator 504 generates preview images of a given piece of content identified by a given search result. The preview images are utilized to define the icons that are presented through the gaming platform interface, which are selectable for accessing the corresponding content or for further exploring related content. Icons which are defined as including preview images of the content they represent can be termed preview icons.

It should be appreciated that a preview image is a graphic depiction providing an indication to the user of the Internet content for which the preview image is generated. For example, if the Internet content is a web page or image, then the preview image may be (or include) a miniaturized graphic rendering of the web page or image, an element of the webpage (e.g. picture, headline, summary, portion of text mentioning the content that was searched), etc. In some implementations, the preview image can be overlaid with a banner indicating the website hosting the Internet content. As another example, if the Internet content is a video, then the preview image might include a representative frame/image from the video, a title of the video, etc.

The results of a search for related Internet content of a given content item can be stored for later retrieval when a user selects the same or similar content for web exploration. For example, for the selected video game in the instant implementation, the search results may be saved as part of the game title association data 510 as web property data 514. The web property data 514 may thus include links or references to web content that was identified by a prior search based on the given video game title. Furthermore, preview images can be saved as part of the game title association data 510 as web previews 516. Thus, when a subsequent request to explore related content for the same video game title is received, the explorer logic 500 may retrieve the preview images and corresponding web content links from the web previews 516 and the web property data 514, and serve these (possibly after filtering) in response to the request. An Internet search may not be required to be carried out. In some implementations, the web property data 514 is checked for its recency, so that if the web property data was generated from a search older than a predefined amount of time, then a new search is performed.

Additionally, in some implementations, an offline search module 506 is configured to perform searches for Internet content related to content items in the user's library when the user is offline or not logged in to the gaming platform interface. The search results can be stored and preview images can be generated and stored as well, as indicated above. In this manner, the system can generate and store in advance the information needed to respond to requests to explore related Internet content.

Figure 6:
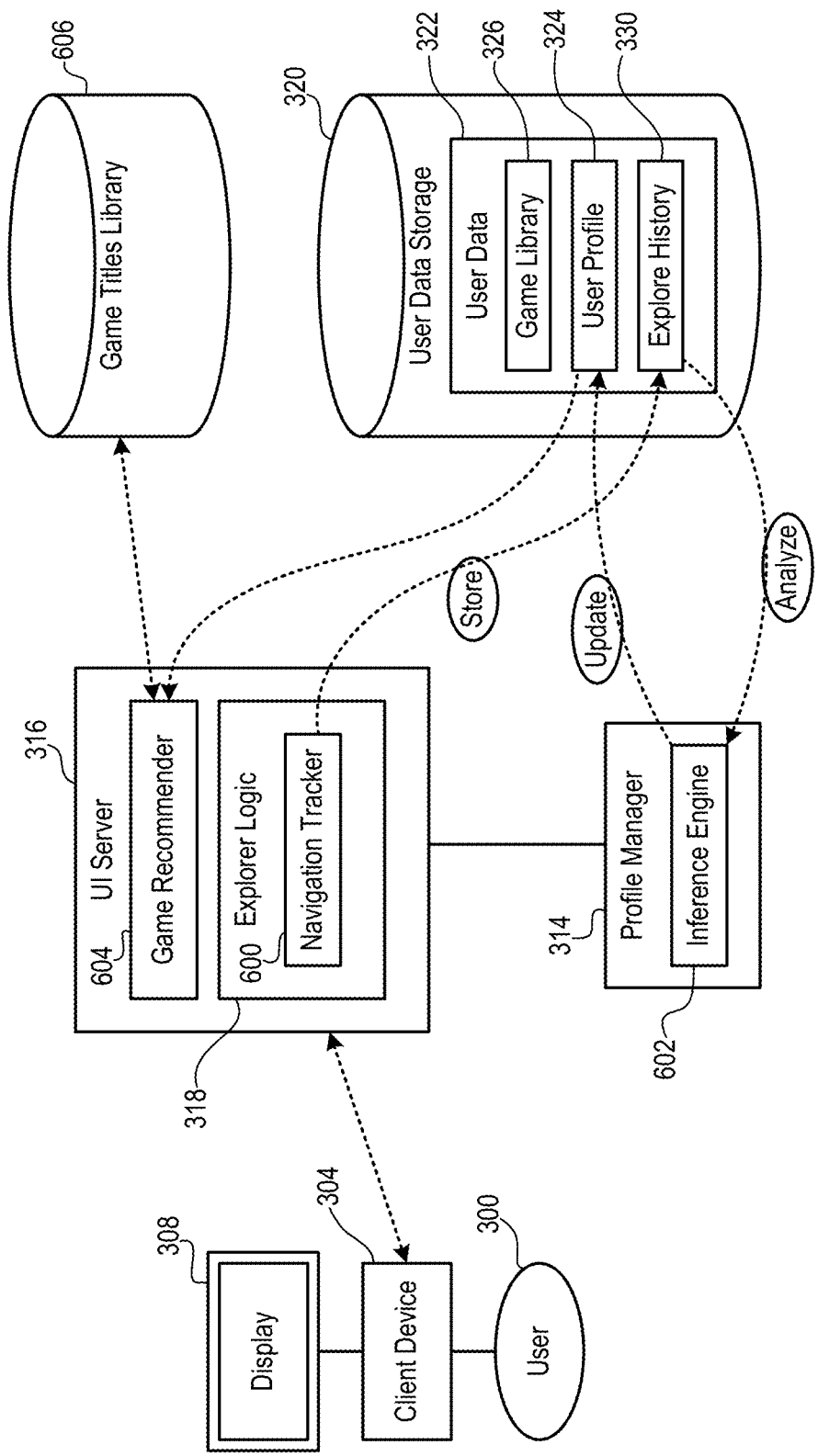
FIG. 6 illustrates a system for recommending video game titles based on Internet exploration activity by a user, in accordance with implementations of the disclosure.

FIG. 6 illustrates a system for recommending video game titles based on Internet exploration activity by a user, in accordance with implementations of the disclosure. In the illustrated implementation, the explorer logic further includes a navigation tracker 600 that is configured to track the user's exploration activity when utilizing the web explorer functionality described herein. For example, the navigation tracker 600 may track, and store to the explore history data 330, the content selected by the user for exploration of related Internet content, the content viewed by the user as a result of exploring related Internet content, the related content shown (or previewed) to the user, etc.

The profile manager 314 further includes an inference engine 602 which is configured to analyze the user's explore history data 330 to determine the user's interests, habits, preferences, etc., which are stored to, or applied to update, the user profile data 324. Based on the user profile data 324, a game recommender 604 generates video game title recommendations, and accesses a game titles library 606 to retrieve icons representing the recommended games for display via the gaming platform interface and/or to retrieve a given game title for gameplay if selected by the user.

Additionally, it will be appreciated that the game recommender 604 can be configured to provide recommendations based on the user profile data 324 but which also fulfill other parameters or purposes. By way of example, the game recommender 604 may determine the game titles that are to be presented as the "Top Recommended," "Now Trending," or "New Releases," game titles, as described above with reference to FIG. 2A. In some implementations, the game recommender 604 may apply the relevant constraints for a given section (as noted previously) to a search of the game titles library to obtain appropriate game titles, and may sort or filter the results based on the user profile data 324.

Figure 7:
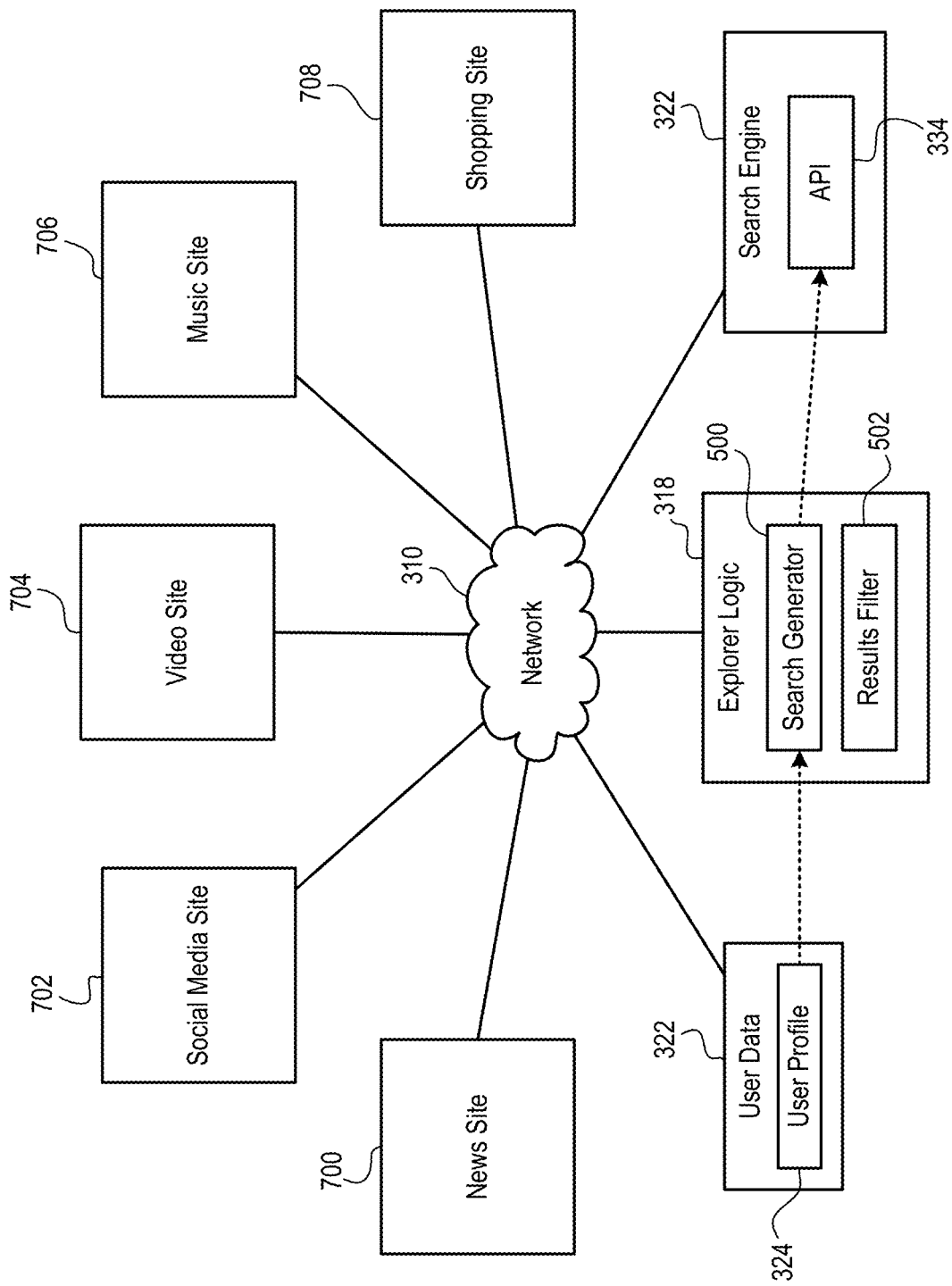
FIG. 7 illustrates a system for performing searches for Internet content related to a video game or other content presented through a gaming platform interface, in accordance with implementations of the disclosure.

FIG. 7 illustrates a system for performing searches for Internet content related to a video game or other content presented through a gaming platform interface, in accordance with implementations of the disclosure. As shown, the search engine 332 may index content from various websites, such as a news site 700, a social media site 702, a video site 704, a music site 706, and a shopping site 708. The search generator 500 is configured to generate a search query accessing an API 334 of the search engine 332 in response to a request to explore related Internet content. The search generator 500 can be configured to tailor the search query based on the user profile data 324.

For example, the user profile data 324 may include keywords associated with the user, and these keywords can be included as part of the search query, in combination with the other keywords relating to the content item for which related Internet content is sought. The user profile data 324 may define content preferences indicating the types of content that the user prefers to view, and these content preferences can be incorporated in the construction of the search query to favor results that are of the user's preferred content types. Furthermore, the user profile data may indicate specific websites that the user prefers (which may be determined from analysis of the user's explore history), and the search query may be configured to effect a site-specific search by the search engine. For example, the user-profile data may indicate that the user historically accesses content from shopping site 708. The search generator 500 can therefore be configured to generate a search query instituting a search of the shopping site 708. In this manner, relevant search results from the shopping site 708 that have an increased chance of being relevant to the user can be returned in response to the request to explore related Internet content. It will be appreciated that the site-specific search may access an API of the website being searched.

Figure 8:
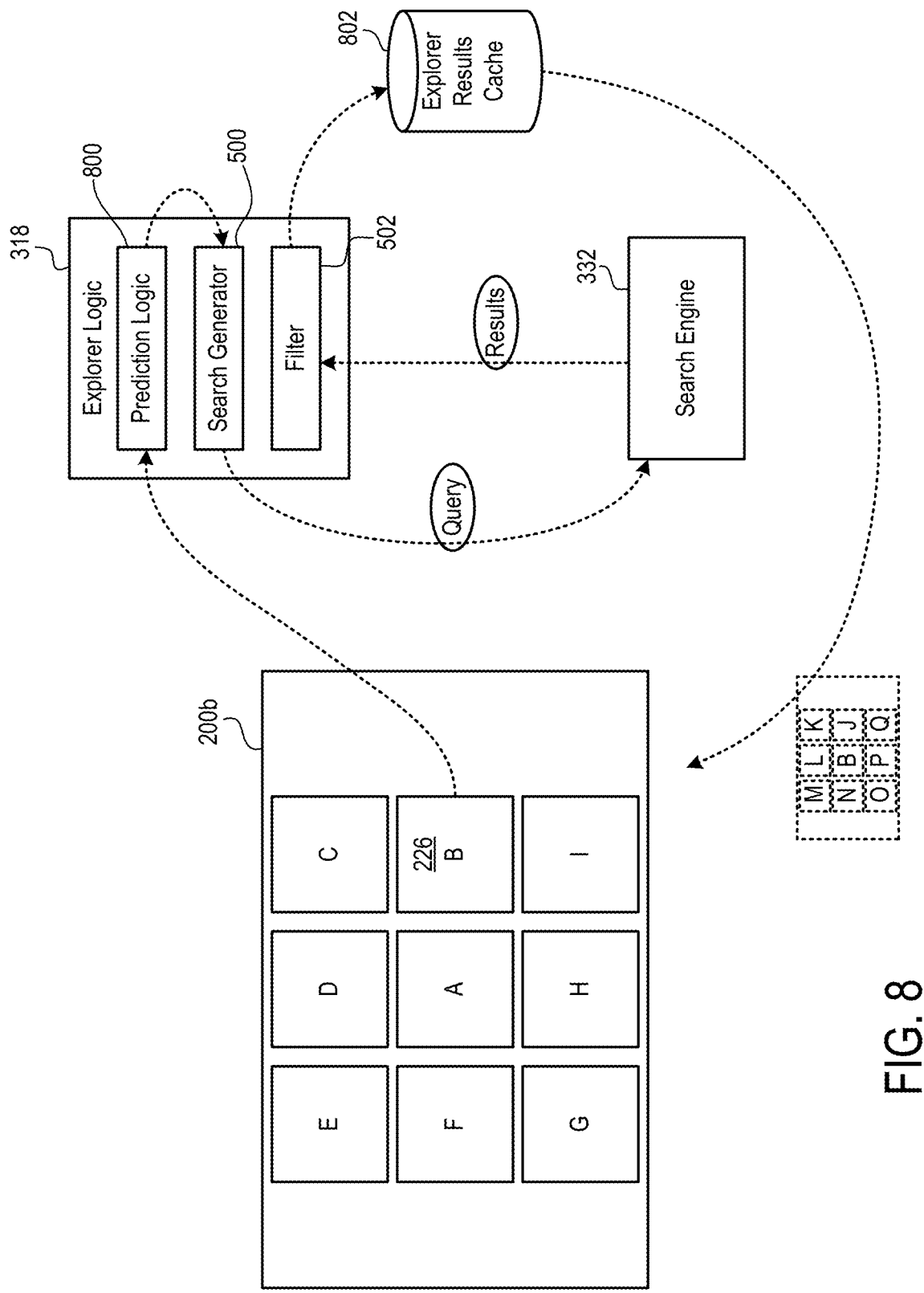
FIG. 8 illustrates a system for predicting user exploration activity of Internet content related to content accessible through a gaming platform interface, in accordance with implementations of the disclosure.

FIG. 8 illustrates a system for predicting user exploration activity of Internet content related to content accessible through a gaming platform interface, in accordance with implementations of the disclosure. In order to minimize delay for the user when exploring related Internet content, in some implementations, the explorer logic 318 includes prediction logic 800 which is configured to predict which content the user is likely to select for exploration. The prediction can be based on various factors such as any of the user profile data, the user's prior explorer history data, recent activity on the gaming platform interface, etc.

By way of example, the prediction logic 800 might predict that the user is most likely to select an icon 226 for further exploration, and therefore the prediction logic 800 activates the search generator 500 to generate a search query based on the content corresponding to the icon 226. As previously discussed, the search query is transmitted to a search engine, which in turn returns search results. The search results can be filtered by the filter 502, and stored to an explorer results cache 802. Preview icons may also be generated and stored. Then if the user selects the icon 226 for exploration of related Internet content, the results and/or preview icons can be immediately retrieved and served to the user's local device for rendering through the gaming platform interface. No delay is incurred from conducting the Internet search, as it was already predictively conducted in advance.

Figure 9A:
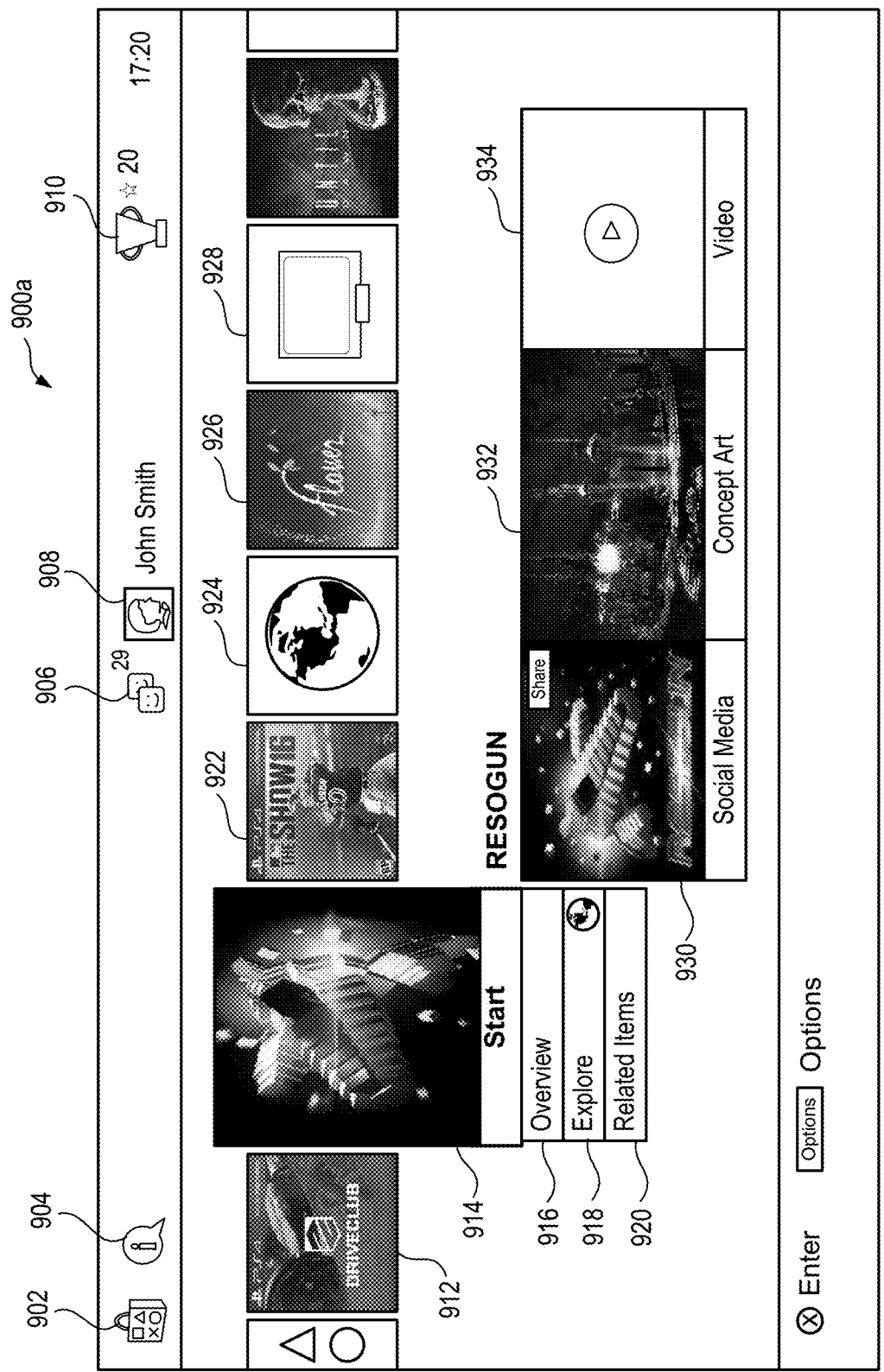
FIG. 9A illustrates a view 900a of a gaming platform interface, in accordance with implementations of the disclosure.

FIG. 9A illustrates a view 900a of a gaming platform interface, in accordance with implementations of the disclosure. In the illustrated implementation, various icons are arranged along the top portion of the interface. These include, by way of example, a content store icon 902 that is selectable to provide access to a content store offering digital content for sale. An information icon 904 is selectable to provide access to platform-related information, such as updates, news, help, or other information related to the gaming platform. A social network icon 906 may confirm the user's online status with a platform-based social network (that is, a social network comprised of users of the gaming platform), and may further display a number in association therewith indicating a number of updates in social network activity for the user's account (e.g. posts or other activity from friends of the user on the platform-based social network). It will be appreciated that the social network icon 906 can be selectable to enable the user to view the activity on the platform-based social network. A profile icon 908 may indicate the current user that is logged in to the gaming platform. A trophy icon 910 can indicate trophies, achievements, and/or a status of the user resulting from accomplishment of various gameplay criteria. The trophy icon 910 can be selectable to enable the user to view his/her trophies.

The illustrated interface further defines a horizontal arrangement of content icons, including, for example, icons 912, 914, 922, 924, 926, and 928, which are representative of various content items that may be accessed through the gaming platform interface. In the illustrated implementation, the icons 912, 914, 922, 926, and 928 represent particular video games that can be initiated for gameplay, though it will be appreciated that other types of content may be represented by the icons. The icon 924 represents a web explorer feature in accordance with embodiments described herein. The user may navigate amongst the icons by, for example, providing input such as button input or directional input via a controller device. In some implementations, the currently active icon is displayed in a recognizable fashion, such as being larger, highlighted, shown with an indicator, etc. In the illustrated implementation, the icon 914 is displayed in a larger form factor than the other icons, thereby indicating that it is the active icon and ready to be selected by the user.

In the illustrated implementation, the icon 914 is representative of the video game "Resogun," and selection of the icon 914 will initiate the video game "Resogun." Additionally, as the icon 914 is currently active, further related options are shown, including an overview option 916 (providing access to an overview of the game), an explore option 918 (providing access to related Internet content), and a related items option 920 (providing access to additional items related to the game). In the illustrated implementation, the explore option 918 is currently active, and in response, additional icons 930, 932, and 934 are shown, indicating types of web content that can be accessed through the web explorer feature. By way of example, the icon 930 indicates social media content, the icon 932 indicates concept art content, and the icon 934 indicates video content. In some implementations, each of the icons 930, 932, and 934 can be selectable to provide access to the content type indicated by the icon. It should be appreciated that additional types of content can be represented, and that the particular content types shown may be determined based on a user profile/preferences and/or the user's browsing history.

Figure 9B:
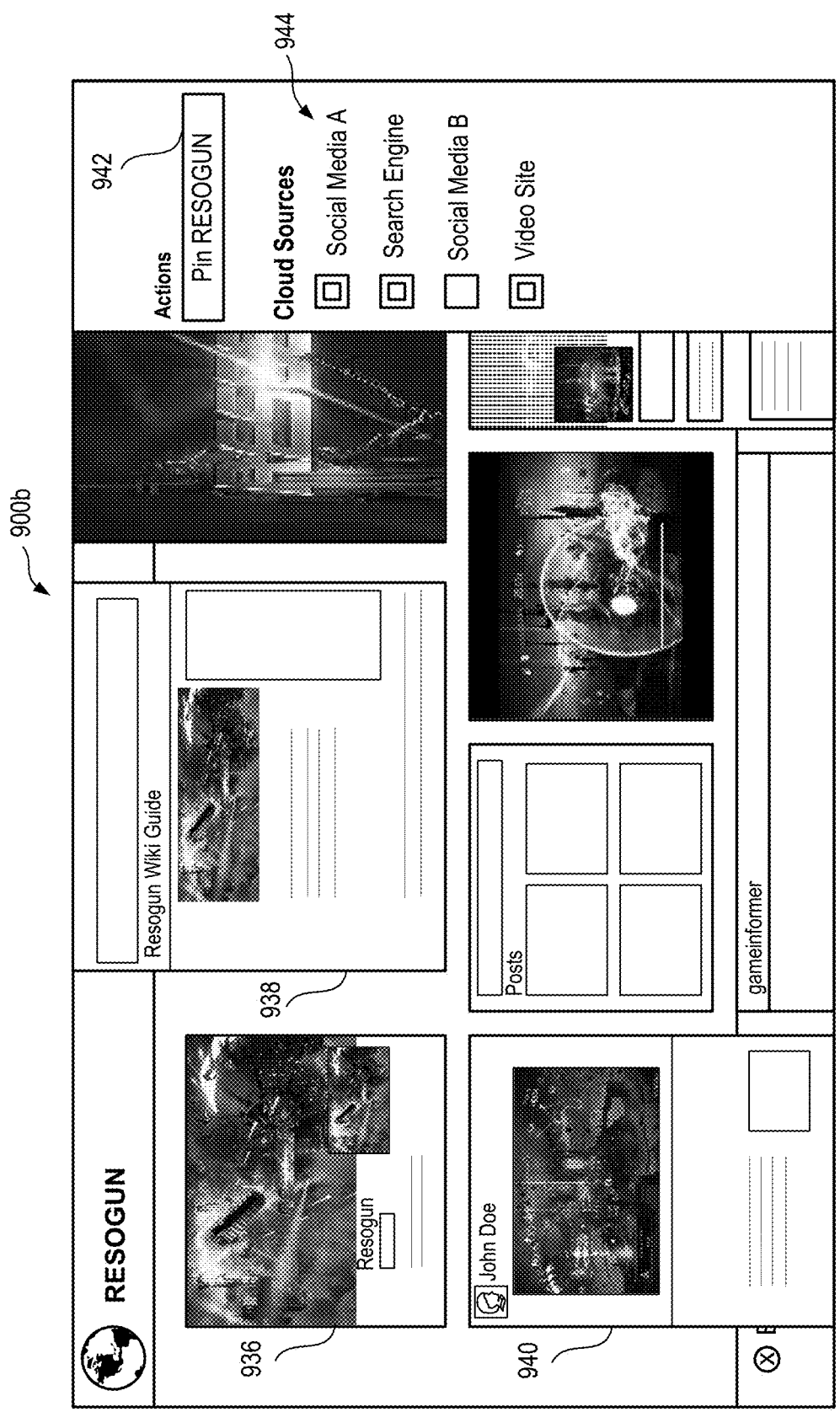
FIG. 9B illustrates a view of the gaming platform interface following selection of an explore option that shows various pieces of Internet content that are related to the video game "Resogun," in accordance with implementations of the disclosure.

Selection of the explore option 918 provides access to the web explorer feature as has been noted. After selection of the explore option 918, the gaming platform interface navigates to a view 900b (shown at FIG. 9B) that shows various pieces of Internet content that are related to the video game "Resogun." As noted above, the Internet content can be obtained through a structured search query based on indicated user preferences and other considerations. In the illustrated implementation, the Internet content is arranged as a plurality of previews, such as previews 936, 938, and 940. The previews can be selected to magnify the corresponding Internet content, such as by maximizing the Internet content to the display, or by displaying a magnified view of the Internet content that is overlaid on the current interface view 900b.

Shown at the right in the view 900b, is an option 942 to "Pin" the video game "Resogun," which acts as a bookmarking feature. Additionally shown at reference 944 is a cloud source configuration interface, wherein the user may designate which Internet sources from which to obtain content. Thus when the user wishes to explore Internet content for the game "Resogun," then content from the designated Internet sources will be provided and/or prioritized for presentation to the user.

Figure 9C:
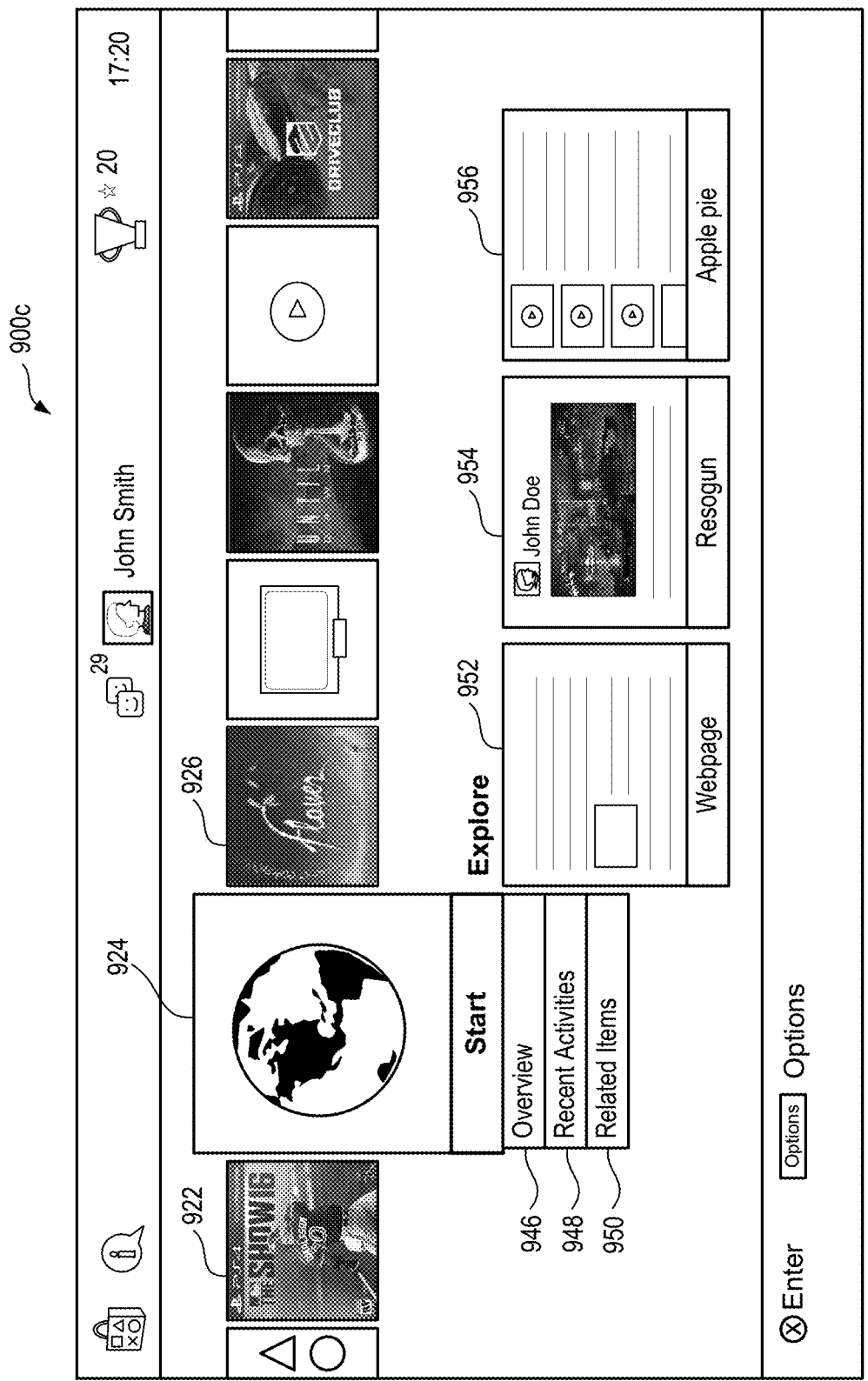
FIG. 9C illustrates a view 900c of the gaming platform interface, in accordance with implementations of the disclosure.

FIG. 9C illustrates a view 900c of the gaming platform interface, in accordance with implementations of the disclosure. In the illustrated implementation, the user has navigated so that the icon 924, which identifies the web explorer feature, is currently active, as indicated by its enlarged appearance relative to the other icons. Selection of the active icon 924 will launch the user into the web explorer interface, an example of which is described below. Additional options include: an overview option 946, which in some implementations may provide explanatory detail regarding the web explorer feature to the user; a recent activities option 948, which provides recently explored topics and/or suggested topics based on recent activity (e.g. gameplay of one or more video games, game purchases, social network activity, etc.); and, a related items option 950, which may provide access to items that are related to the web explorer feature.

In some implementations, while the icon 924 is currently active, then additional icons may be displayed that identify, by way of example, topics that have been recently explored, specific Internet content that has been viewed, and/or recommended topics or Internet content. By way of example, these may take the form of icons 952, 954, and 956, which may be displayed in response to navigation of the interface so that the icon 924 identifying the web explorer feature is the currently active icon.

Figure 9D:
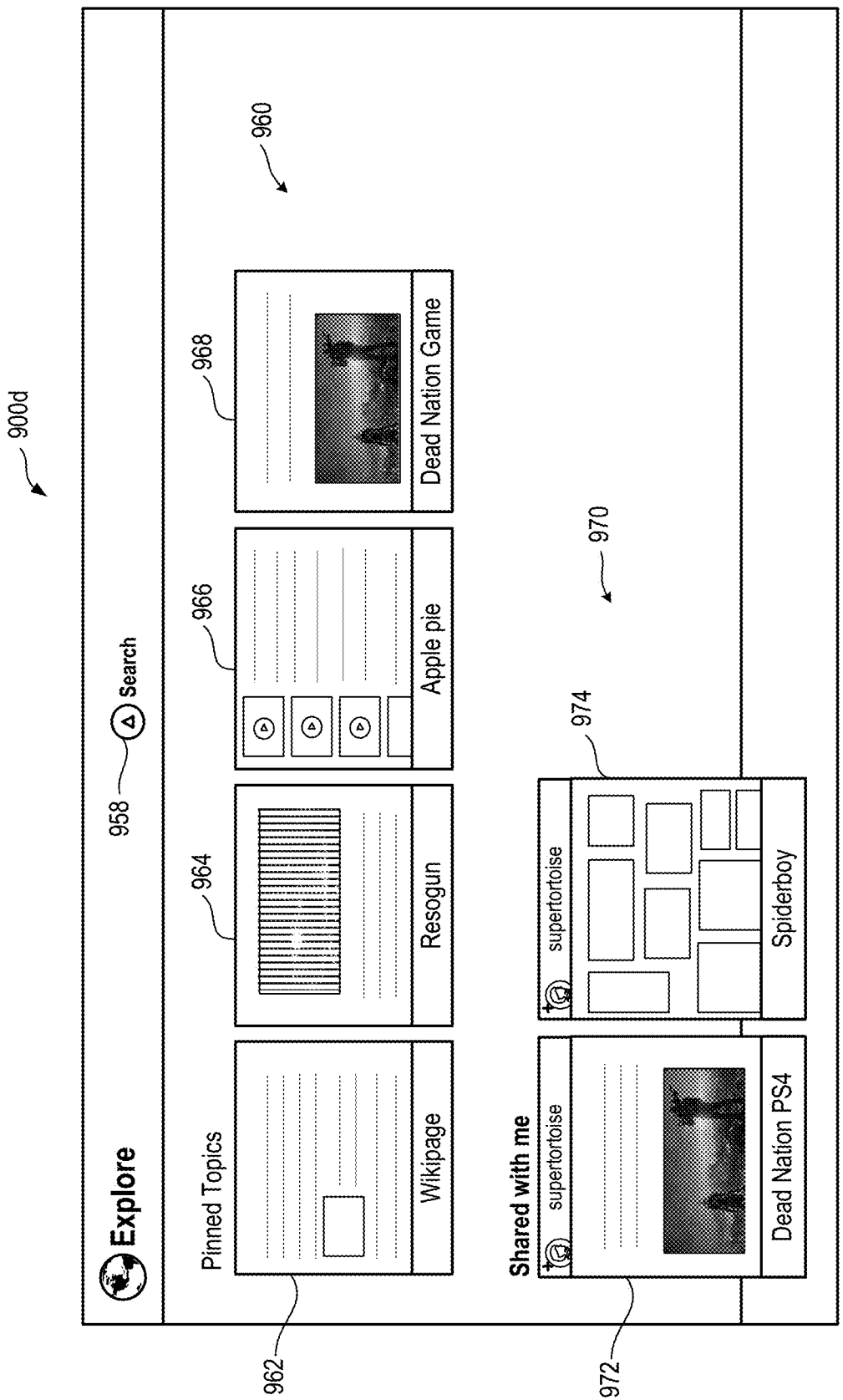
FIG. 9D illustrates a view of the gaming platform interface, wherein the web explorer feature has been initiated, in accordance with implementations of the disclosure.

FIG. 9D illustrates a view of the gaming platform interface, wherein the web explorer feature has been initiated, in accordance with implementations of the disclosure. In the view 900d, a search button 958 is provided, which may be selected to activate a search feature whereby a user may enter a topic on which to carry out a search for related Internet content. A pinned topics section 960 is provided in the view 900d, including icons 962, 964, 966, and 968, identifying various topics that have been pinned or bookmarked by the user. A shared section 970 includes icons 972 and 974 in the illustrated implementation, identifying Internet content that has been shared with the user by another user. It will be appreciated that that two users can be friends on a social network (e.g. a social network of the gaming platform or a third-party social network).

FIG. 10 illustrates an interface 1000 for setting user interests that will be utilized to determine appropriate Internet content to provide to the user, in accordance with implementations of the disclosure. In the illustrated implementation, the user is asked to rate their participation in various activities, such as gaming, video/TV, music, and socializing. Corresponding sliders 1002, 1004, 1006, and 1008 are adjustable along respective slider bars to enable the user to customize their interest levels for these activities, and to thereby customize their experience when utilizing the web explorer feature described herein.

Figure 11:
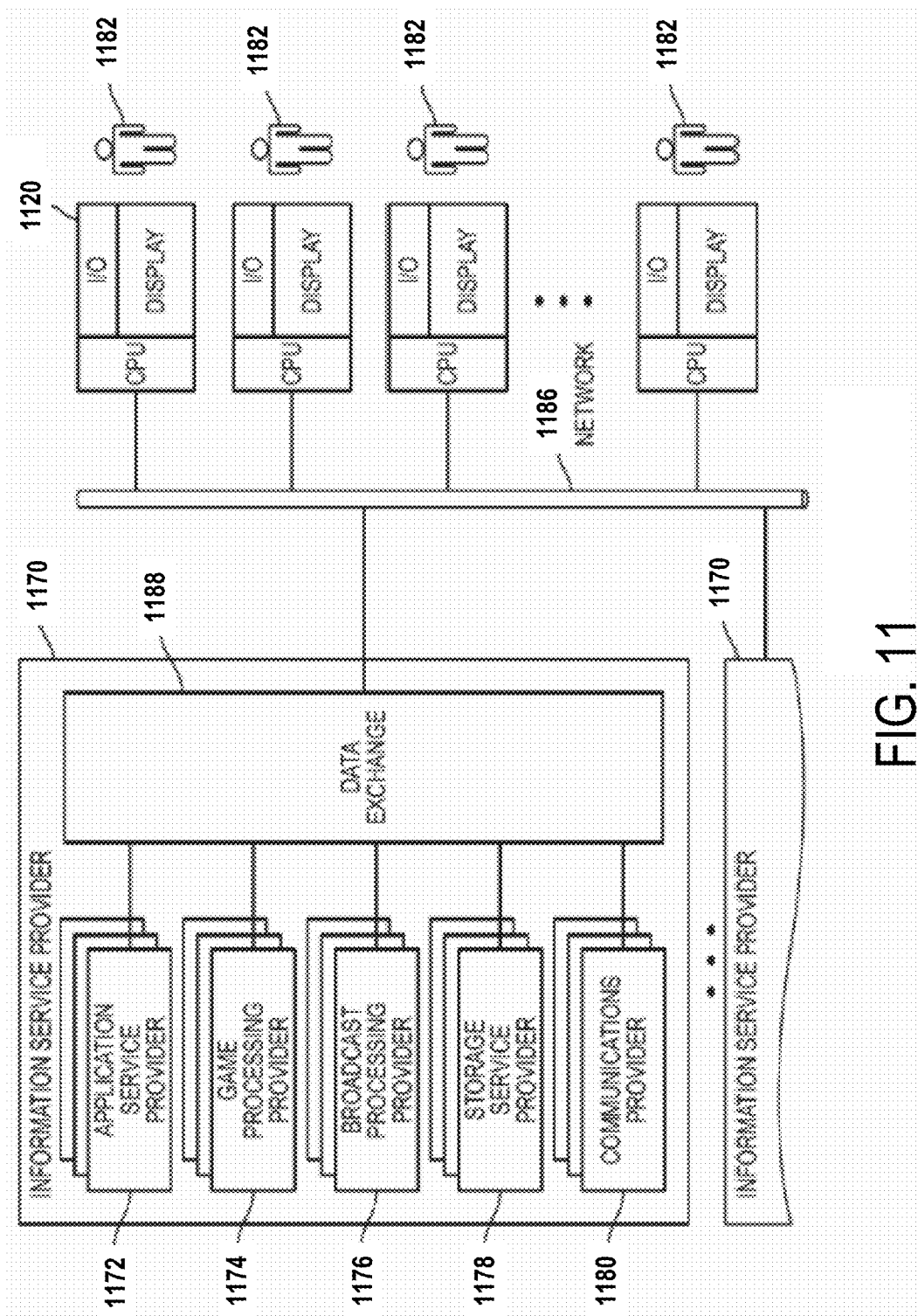
FIG. 11 illustrates an exemplary Information Service Provider architecture for delivering informational content and services to users who are geographically dispersed and connected via a network, in accordance with implementations of the disclosure.

FIG. 11 illustrates an embodiment of an Information Service Provider architecture. Information Service Providers (ISP) 1170 delivers a multitude of information services to users 1182 geographically dispersed and connected via network 1186. An ISP can deliver just one type of service, such as stock price updates, or a variety of services such as broadcast media, news, sports, gaming, etc. Additionally, the services offered by each ISP are dynamic, that is, services can be added or taken away at any point in time. Thus, the ISP providing a particular type of service to a particular individual can change over time. For example, a user may be served by an ISP in near proximity to the user while the user is in her home town, and the user may be served by a different ISP when the user travels to a different city. The home-town ISP will transfer the required information and data to the new ISP, such that the user information "follows" the user to the new city making the data closer to the user and easier to access. In another embodiment, a master-server relationship may be established between a master ISP, which manages the information for the user, and a server ISP that interfaces directly with the user under control from the master ISP. In another embodiment, the data is transferred from one ISP to another ISP as the client moves around the world to make the ISP in better position to service the user be the one that delivers these services.

ISP 1170 includes Application Service Provider (ASP) 1172, which provides computer-based services to customers over a network. Software offered using an ASP model is also sometimes called on-demand software or software as a service (SaaS). A simple form of providing access to a particular application program (such as customer relationship management) is by using a standard protocol such as HTTP. The application software resides on the vendor's system and is accessed by users through a web browser using HTML, by special purpose client software provided by the vendor, or other remote interface such as a thin client.

Services delivered over a wide geographical area often use cloud computing. Cloud computing is a style of computing in which dynamically scalable and often virtualized resources are provided as a service over the Internet. Users do not need to be an expert in the technology infrastructure in the "cloud" that supports them. Cloud computing can be divided into different services, such as Infrastructure as a Service (IaaS), Platform as a Service (PaaS), and Software as a Service (SaaS). Cloud computing services often provide common business applications online that are accessed from a web browser, while the software and data are stored on the servers. The term cloud is used as a metaphor for the Internet (e.g., using servers, storage and logic), based on how the Internet is depicted in computer network diagrams and is an abstraction for the complex infrastructure it conceals.

Further, ISP 1170 includes a Game Processing Server (GPS) 1174 which is used by game clients to play single and multiplayer video games. Most video games played over the Internet operate via a connection to a game server. Typically, games use a dedicated server application that collects data from players and distributes it to other players. This is more efficient and effective than a peer-to-peer arrangement, but it requires a separate server to host the server application. In another embodiment, the GPS establishes communication between the players and their respective game-playing devices exchange information without relying on the centralized GPS.

Dedicated GPSs are servers which run independently of the client. Such servers are usually run on dedicated hardware located in data centers, providing more bandwidth and dedicated processing power. Dedicated servers are the preferred method of hosting game servers for most PC-based multiplayer games. Massively multiplayer online games run on dedicated servers usually hosted by the software company that owns the game title, allowing them to control and update content.

Broadcast Processing Server (BPS) 1176 distributes audio or video signals to an audience. Broadcasting to a very narrow range of audience is sometimes called narrowcasting. The final leg of broadcast distribution is how the signal gets to the listener or viewer, and it may come over the air as with a radio station or TV station to an antenna and receiver, or may come through cable TV or cable radio (or "wireless cable") via the station or directly from a network. The Internet may also bring either radio or TV to the recipient, especially with multicasting allowing the signal and bandwidth to be shared. Historically, broadcasts have been delimited by a geographic region, such as national broadcasts or regional broadcast. However, with the proliferation of fast internet, broadcasts are not defined by geographies as the content can reach almost any country in the world.

Storage Service Provider (SSP) 1178 provides computer storage space and related management services. SSPs also offer periodic backup and archiving. By offering storage as a service, users can order more storage as required. Another major advantage is that SSPs include backup services and users will not lose all their data if their computers' hard drives fail. Further, a plurality of SSPs can have total or partial copies of the user data, allowing users to access data in an efficient way independently of where the user is located or the device being used to access the data. For example, a user can access personal files in the home computer, as well as in a mobile phone while the user is on the move.

Communications Provider 1180 provides connectivity to the users. One kind of Communications Provider is an Internet Service Provider (ISP) which offers access to the Internet. The ISP connects its customers using a data transmission technology appropriate for delivering Internet Protocol datagrams, such as dial-up, DSL, cable modem, fiber, wireless or dedicated high-speed interconnects. The Communications Provider can also provide messaging services, such as e-mail, instant messaging, and SMS texting. Another type of Communications Provider is the Network Service provider (NSP) which sells bandwidth or network access by providing direct backbone access to the Internet. Network service providers may consist of telecommunications companies, data carriers, wireless communications providers, Internet service providers, cable television operators offering high-speed Internet access, etc.

Data Exchange 1188 interconnects the several modules inside ISP 1170 and connects these modules to users 1182 via network 1186. Data Exchange 1188 can cover a small area where all the modules of ISP 1170 are in close proximity, or can cover a large geographic area when the different modules are geographically dispersed. For example, Data Exchange 1188 can include a fast Gigabit Ethernet (or faster) within a cabinet of a data center, or an intercontinental virtual area network (VLAN).

Users 1182 access the remote services with client device 1184, which includes at least a CPU, a memory, a display and I/O. The client device can be a PC, a mobile phone, a netbook, tablet, gaming system, a PDA, etc. In one embodiment, ISP 1170 recognizes the type of device used by the client and adjusts the communication method employed. In other cases, client devices use a standard communications method, such as html, to access ISP 1170.

Embodiments of the present disclosure may be practiced with various computer system configurations including hand-held devices, microprocessor systems, microprocessor-based or programmable consumer electronics, minicomputers, mainframe computers and the like. The disclosure can also be practiced in distributed computing environments where tasks are performed by remote processing devices that are linked through a wire-based or wireless network.

With the above embodiments in mind, it should be understood that the disclosure can employ various computer-implemented operations involving data stored in computer systems. These operations are those requiring physical manipulation of physical quantities. Any of the operations described herein that form part of the disclosure are useful machine operations. The disclosure also relates to a device or an apparatus for performing these operations. The apparatus can be specially constructed for the required purpose, or the apparatus can be a general-purpose computer selectively activated or configured by a computer program stored in the computer. In particular, various general-purpose machines can be used with computer programs written in accordance with the teachings herein, or it may be more convenient to construct a more specialized apparatus to perform the required operations.

The disclosure can also be embodied as computer readable code on a computer readable medium. Alternately, the computer readable code may be downloaded from a server using the data exchange interconnects described above. The computer readable medium is any data storage device that can store data, which can be thereafter be read by a computer system. Examples of the computer readable medium include hard drives, network attached storage (NAS), read-only memory, random-access memory, CD-ROMs, CD-Rs, CD-RWs, magnetic tapes and other optical and non-optical data storage devices. The computer readable medium can include computer readable tangible medium distributed over a network-coupled computer system so that the computer readable code is stored and executed in a distributed fashion.

Although the method operations were described in a specific order, it should be understood that other housekeeping operations may be performed in between operations, or operations may be adjusted so that they occur at slightly different times, or may be distributed in a system which allows the occurrence of the processing operations at various intervals associated with the processing, as long as the processing of the overlay operations are performed in the desired way.

Although the foregoing disclosure has been described in some detail for purposes of clarity of understanding, it will be apparent that certain changes and modifications can be practiced within the scope of the appended claims. Accordingly, the present embodiments are to be considered as illustrative and not restrictive, and the disclosure is not to be limited to the details given herein, but may be modified within the scope and equivalents of the described embodiments.

Figure 12:
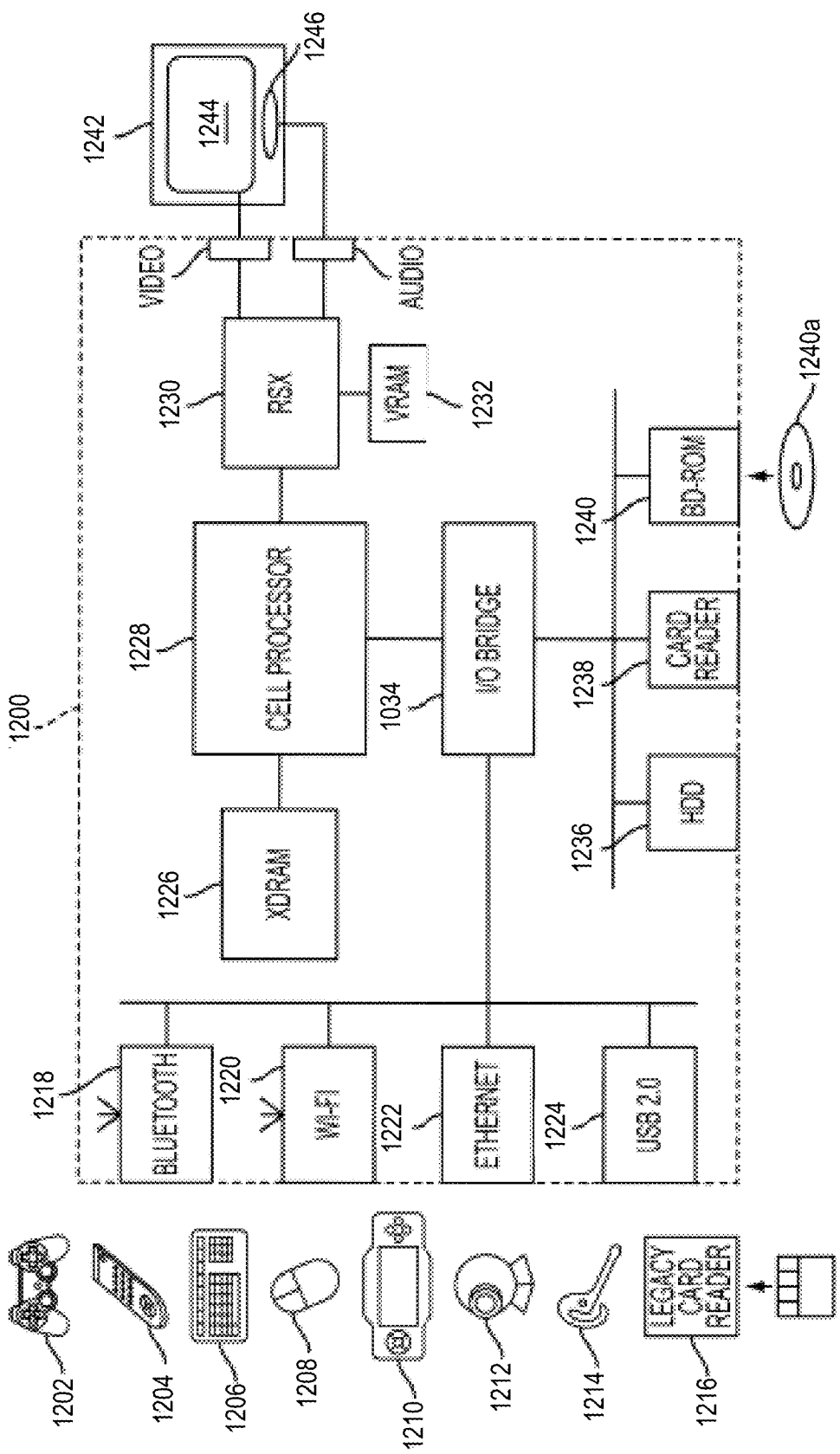
FIG. 12 illustrates exemplary components of a computing device used for controlling content presented to a user, in accordance with implementations of the disclosure.

FIG. 12 schematically illustrates the overall system architecture of a gaming console, such as Sony® Playstation 3® entertainment device, that may be compatible with controllers for implementing an avatar control system in accordance with one embodiment of the present disclosure. A system unit 1200 is provided, with various peripheral devices connectable to the system unit 1200. The system unit 1200 can in some implementations be a computing server. The system unit 1200 comprises: a Cell processor 1228; a Rambus® dynamic random access memory (XDRAM) unit 1226; a Reality Synthesizer graphics unit 1230 with a dedicated video random access memory (VRAM) unit 1232; and an I/O bridge 1234. The system unit 1200 also comprises a Blu Ray® Disk BD-ROM® optical disk reader 1240 for reading from a disk 1240a and a removable slot-in hard disk drive (HDD) 1236, accessible through the I/O bridge 1234. Optionally the system unit 1200 also comprises a memory card reader 1238 for reading compact flash memory cards, Memory Stick® memory cards and the like, which is similarly accessible through the I/O bridge 1234.

The I/O bridge 1234 also connects to six Universal Serial Bus (USB) 2.0 ports 1224; a gigabit Ethernet port 1222; an IEEE 802.11b/g wireless network (Wi-Fi) port 1220; and a Bluetooth® wireless link port 1218 capable of supporting of up to seven Bluetooth connections.

In operation the I/O bridge 1234 handles all wireless, USB and Ethernet data, including data from one or more game controllers 1202. For example when a user is playing a game, the I/O bridge 1234 receives data from the game controller 1202 via a Bluetooth link and directs it to the Cell processor 1228, which updates the current state of the game accordingly.

The wireless, USB and Ethernet ports also provide connectivity for other peripheral devices in addition to game controllers 1202, such as: a remote control 1204; a keyboard 1206; a mouse 1208; a portable entertainment device 1210 such as a Sony Playstation Portable® entertainment device; a video camera such as an EyeToy® video camera 1212; and a microphone headset 1214. Such peripheral devices may therefore in principle be connected to the system unit 1200 wirelessly; for example the portable entertainment device 1210 may communicate via a Wi-Fi ad-hoc connection, whilst the microphone headset 1214 may communicate via a Bluetooth link.

The provision of these interfaces means that the Playstation 3 device is also potentially compatible with other peripheral devices such as digital video recorders (DVRs), set-top boxes, digital cameras, portable media players, Voice over IP telephones, mobile telephones, printers and scanners.

In addition, a legacy memory card reader 1216 may be connected to the system unit via a USB port 1224, enabling the reading of memory cards 1248 of the kind used by the Playstation® or Playstation 2® devices.

In the present embodiment, the game controller 1202 is operable to communicate wirelessly with the system unit 1200 via the Bluetooth link. However, the game controller 1202 can instead be connected to a USB port, thereby also providing power by which to charge the battery of the game controller 1202. In addition to one or more analog joysticks and conventional control buttons, the game controller is sensitive to motion in six degrees of freedom, corresponding to translation and rotation in each axis. Consequently gestures and movements by the user of the game controller may be translated as inputs to a game in addition to or instead of conventional button or joystick commands. Optionally, other wirelessly enabled peripheral devices such as the Playstation™ Portable device may be used as a controller. In the case of the Playstation™ Portable device, additional game or control information (for example, control instructions or number of lives) may be provided on the screen of the device. Other alternative or supplementary control devices may also be used, such as a dance mat (not shown), a light gun (not shown), a steering wheel and pedals (not shown) or bespoke controllers, such as a single or several large buttons for a rapid-response quiz game (also not shown).

The remote control 1204 is also operable to communicate wirelessly with the system unit 1200 via a Bluetooth link. The remote control 1204 comprises controls suitable for the operation of the Blu Ray™ Disk BD-ROM reader 1240 and for the navigation of disk content.

The Blu Ray™ Disk BD-ROM reader 1240 is operable to read CD-ROMs compatible with the Playstation and PlayStation 2 devices, in addition to conventional pre-recorded and recordable CDs, and so-called Super Audio CDs. The reader 1240 is also operable to read DVD-ROMs compatible with the PlayStation 2 and PlayStation 3 devices, in addition to conventional pre-recorded and recordable DVDs. The reader 1240 is further operable to read BD-ROMs compatible with the Playstation 3 device, as well as conventional pre-recorded and recordable Blu-Ray Disks.

The system unit 1200 is operable to supply audio and video, either generated or decoded by the Playstation 3 device via the Reality Synthesizer graphics unit 1230, through audio and video connectors to a display and sound output device 1242 such as a monitor or television set having a display 1244 and one or more loudspeakers 1246. The audio connectors 1250 may include conventional analogue and digital outputs whilst the video connectors 1252 may variously include component video, S-video, composite video and one or more High Definition Multimedia Interface (HDMI) outputs. Consequently, video output may be in formats such as PAL or NTSC, or in 720p, 1080i or 1080p high definition.

Audio processing (generation, decoding and so on) is performed by the Cell processor 1228. The Playstation 3 device's operating system supports Dolby® 5.1 surround sound, Dolby® Theatre Surround (DTS), and the decoding of 7.1 surround sound from Blu-Ray® disks.

In the present embodiment, the video camera 1212 comprises a single charge coupled device (CCD), an LED indicator, and hardware-based real-time data compression and encoding apparatus so that compressed video data may be transmitted in an appropriate format such as an intra-image based MPEG (motion picture expert group) standard for decoding by the system unit 1200. The camera LED indicator is arranged to illuminate in response to appropriate control data from the system unit 1200, for example to signify adverse lighting conditions. Embodiments of the video camera 1212 may variously connect to the system unit 1200 via a USB, Bluetooth or Wi-Fi communication port. Embodiments of the video camera may include one or more associated microphones and also be capable of transmitting audio data. In embodiments of the video camera, the CCD may have a resolution suitable for high-definition video capture. In use, images captured by the video camera may for example be incorporated within a game or interpreted as game control inputs.

In general, in order for successful data communication to occur with a peripheral device such as a video camera or remote control via one of the communication ports of the system unit 1200, an appropriate piece of software such as a device driver should be provided. Device driver technology is well-known and will not be described in detail here, except to say that the skilled man will be aware that a device driver or similar software interface may be required in the present embodiment described.

Figure 13:
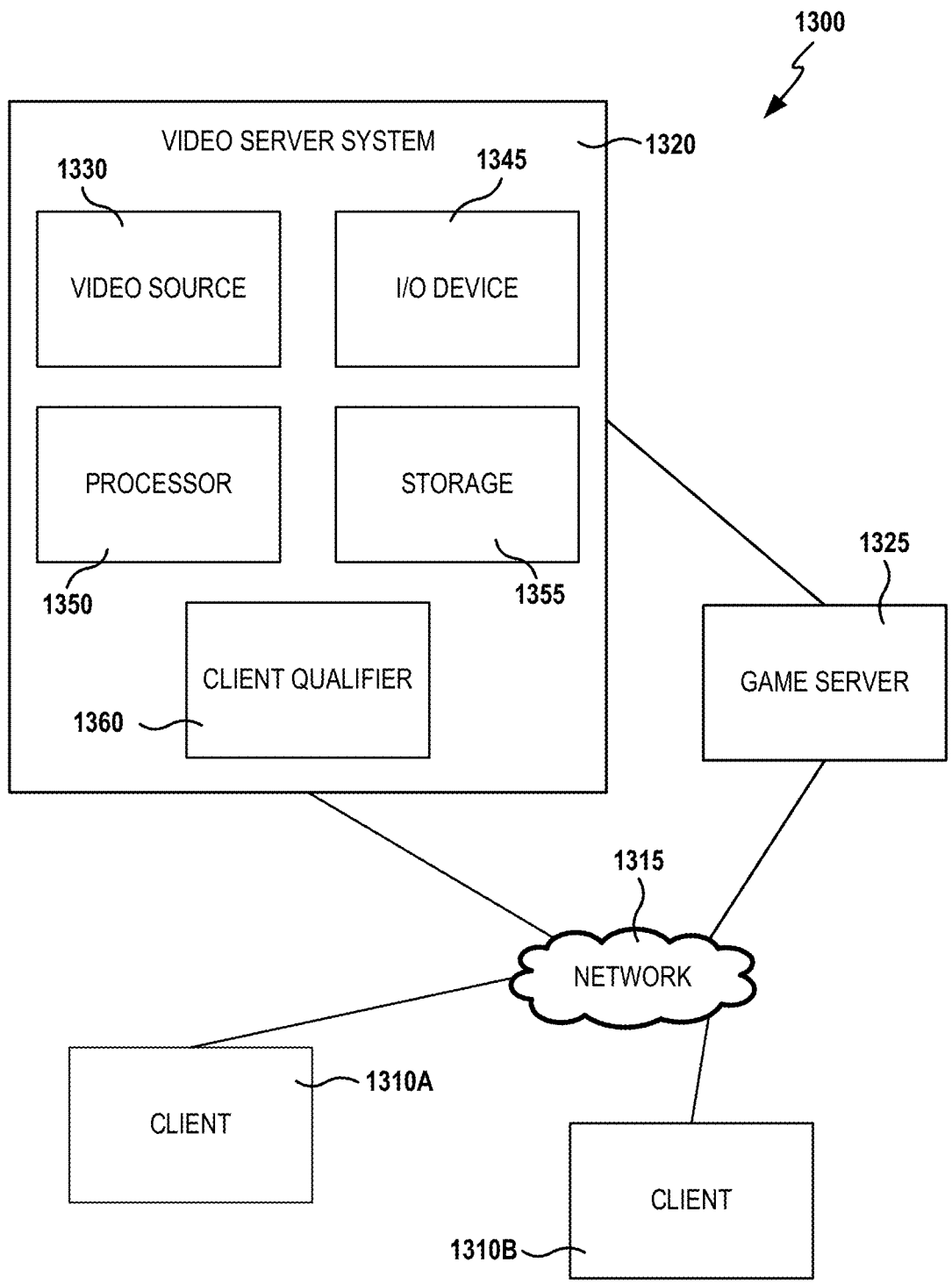
FIG. 13 is a block diagram of a Game System 1100, in accordance with implementations of the disclosure.

FIG. 13 is a block diagram of a Game System 1300, in accordance with implementations of the disclosure. Game System 1300 is configured to provide a video stream to one or more Clients 1310 via a Network 1315. Game System 1300 typically includes a Video Server System 1320 and an optional game server 1325. Video Server System 1320 is configured to provide the video stream to the one or more Clients 1310 with a minimal quality of service. For example, Video Server System 1320 may receive a game command that changes the state of or a point of view within a video game, and provide Clients 1310 with an updated video stream reflecting this change in state with minimal lag time. The Video Server System 1320 may be configured to provide the video stream in a wide variety of alternative video formats, including formats yet to be defined. Further, the video stream may include video frames configured for presentation to a user at a wide variety of frame rates. Typical frame rates are 30 frames per second, 60 frames per second, and 1320 frames per second. Although higher or lower frame rates are included in alternative embodiments of the disclosure.

Clients 1310, referred to herein individually as 1310A., 1310B., etc., may include head mounted displays, terminals, personal computers, game consoles, tablet computers, telephones, set top boxes, kiosks, wireless devices, digital pads, stand-alone devices, handheld game playing devices, and/or the like. Typically, Clients 1310 are configured to receive encoded video streams, decode the video streams, and present the resulting video to a user, e.g., a player of a game. The processes of receiving encoded video streams and/or decoding the video streams typically includes storing individual video frames in a receive buffer of the client. The video streams may be presented to the user on a display integral to Client 1310 or on a separate device such as a monitor or television. Clients 1310 are optionally configured to support more than one game player. For example, a game console may be configured to support two, three, four or more simultaneous players. Each of these players may receive a separate video stream, or a single video stream may include regions of a frame generated specifically for each player, e.g., generated based on each player's point of view. Clients 1310 are optionally geographically dispersed. The number of clients included in Game System 1300 may vary widely from one or two to thousands, tens of thousands, or more. As used herein, the term "game player" is used to refer to a person that plays a game and the term "game playing device" is used to refer to a device used to play a game. In some embodiments, the game playing device may refer to a plurality of computing devices that cooperate to deliver a game experience to the user. For example, a game console and an HMD may cooperate with the video server system 1320 to deliver a game viewed through the HMD. In one embodiment, the game console receives the video stream from the video server system 1320, and the game console forwards the video stream, or updates to the video stream, to the HMD for rendering.

Clients 1310 are configured to receive video streams via Network 1315. Network 1315 may be any type of communication network including, a telephone network, the Internet, wireless networks, powerline networks, local area networks, wide area networks, private networks, and/or the like. In typical embodiments, the video streams are communicated via standard protocols, such as TCP/IP or UDP/IP. Alternatively, the video streams are communicated via proprietary standards.

A typical example of Clients 1310 is a personal computer comprising a processor, non-volatile memory, a display, decoding logic, network communication capabilities, and input devices. The decoding logic may include hardware, firmware, and/or software stored on a computer readable medium. Systems for decoding (and encoding) video streams are well known in the art and vary depending on the particular encoding scheme used.

Clients 1310 may, but are not required to, further include systems configured for modifying received video. For example, a client may be configured to perform further rendering, to overlay one video image on another video image, to crop a video image, and/or the like. For example, Clients 1310 may be configured to receive various types of video frames, such as I-frames, P-frames and B-frames, and to process these frames into images for display to a user. In some embodiments, a member of Clients 1310 is configured to perform further rendering, shading, conversion to 3-D, or like operations on the video stream. A member of Clients 1310 is optionally configured to receive more than one audio or video stream. Input devices of Clients 1310 may include, for example, a one-hand game controller, a two-hand game controller, a gesture recognition system, a gaze recognition system, a voice recognition system, a keyboard, a joystick, a pointing device, a force feedback device, a motion and/or location sensing device, a mouse, a touch screen, a neural interface, a camera, input devices yet to be developed, and/or the like.

The video stream (and optionally audio stream) received by Clients 1310 is generated and provided by Video Server System 1320. As is described further elsewhere herein, this video stream includes video frames (and the audio stream includes audio frames). The video frames are configured (e.g., they include pixel information in an appropriate data structure) to contribute meaningfully to the images displayed to the user. As used herein, the term "video frames" is used to refer to frames including predominantly information that is configured to contribute to, e.g. to effect, the images shown to the user. Most of the teachings herein with regard to "video frames" can also be applied to "audio frames."

Clients 1310 are typically configured to receive inputs from a user. These inputs may include game commands configured to change the state of the video game or otherwise affect game play. The game commands can be received using input devices and/or may be automatically generated by computing instructions executing on Clients 1310. The received game commands are communicated from Clients 1310 via Network 1315 to Video Server System 1320 and/or Game Server 1325. For example, in some embodiments, the game commands are communicated to Game Server 1325 via Video Server System 1320. In some embodiments, separate copies of the game commands are communicated from Clients 1310 to Game Server 1325 and Video Server System 1320. The communication of game commands is optionally dependent on the identity of the command. Game commands are optionally communicated from Client 1310A through a different route or communication channel that that used to provide audio or video streams to Client 1310A.

Game Server 1325 is optionally operated by a different entity than Video Server System 1320. For example, Game Server 1325 may be operated by the publisher of a multiplayer game. In this example, Video Server System 1320 is optionally viewed as a client by Game Server 1325 and optionally configured to appear from the point of view of Game Server 1325 to be a prior art client executing a prior art game engine. Communication between Video Server System 1320 and Game Server 1325 optionally occurs via Network 1315. As such, Game Server 1325 can be a prior art multiplayer game server that sends game state information to multiple clients, one of which is game server system 1320. Video Server System 1320 may be configured to communicate with multiple instances of Game Server 1325 at the same time. For example, Video Server System 1320 can be configured to provide a plurality of different video games to different users. Each of these different video games may be supported by a different Game Server 1325 and/or published by different entities. In some embodiments, several geographically distributed instances of Video Server System 1320 are configured to provide game video to a plurality of different users. Each of these instances of Video Server System 1320 may be in communication with the same instance of Game Server 1325. Communication between Video Server System 1320 and one or more Game Server 1325 optionally occurs via a dedicated communication channel. For example, Video Server System 1320 may be connected to Game Server 1325 via a high bandwidth channel that is dedicated to communication between these two systems.

Video Server System 1320 comprises at least a Video Source 1330, an I/O Device 1345, a Processor 1350, and non-transitory Storage 1355. Video Server System 1320 may include one computing device or be distributed among a plurality of computing devices. These computing devices are optionally connected via a communications system such as a local area network.

Video Source 1330 is configured to provide a video stream, e.g., streaming video or a series of video frames that form a moving picture. In some embodiments, Video Source 1330 includes a video game engine and rendering logic. The video game engine is configured to receive game commands from a player and to maintain a copy of the state of the video game based on the received commands. This game state includes the position of objects in a game environment, as well as typically a point of view. The game state may also include properties, images, colors and/or textures of objects. The game state is typically maintained based on game rules, as well as game commands such as move, turn, attack, set focus to, interact, use, and/or the like. Part of the game engine is optionally disposed within Game Server 1325. Game Server 1325 may maintain a copy of the state of the game based on game commands received from multiple players using geographically disperse clients. In these cases, the game state is provided by Game Server 1325 to Video Source 1330, wherein a copy of the game state is stored and rendering is performed. Game Server 1325 may receive game commands directly from Clients 1310 via Network 1315, and/or may receive game commands via Video Server System 1320.

Video Source 1330 typically includes rendering logic, e.g., hardware, firmware, and/or software stored on a computer readable medium such as Storage 1355. This rendering logic is configured to create video frames of the video stream based on the game state. All or part of the rendering logic is optionally disposed within a graphics processing unit (GPU). Rendering logic typically includes processing stages configured for determining the three-dimensional spatial relationships between objects and/or for applying appropriate textures, etc., based on the game state and viewpoint. The rendering logic produces raw video that is then usually encoded prior to communication to Clients 1310. For example, the raw video may be encoded according to an Adobe Flash® standard, .wav, H.265, H.264, H.263, On2, VP6, VC-1, WMA, Huffyuv, Lagarith, MPG-x. Xvid. FFmpeg, x264, VP6-8, realvideo, mp3, or the like. The encoding process produces a video stream that is optionally packaged for delivery to a decoder on a remote device. The video stream is characterized by a frame size and a frame rate. Typical frame sizes include 800×600, 1280×720 (e.g., 720p), 1024×768, although any other frame sizes may be used. The frame rate is the number of video frames per second. A video stream may include different types of video frames. For example, the H.264 standard includes a "P" frame and an "I" frame. I-frames include information to refresh all macro blocks/pixels on a display device, while P-frames include information to refresh a subset thereof. P-frames are typically smaller in data size than are I-frames. As used herein the term "frame size" is meant to refer to a number of pixels within a frame. The term "frame data size" is used to refer to a number of bytes required to store the frame.

In alternative embodiments Video Source 1330 includes a video recording device such as a camera. This camera may be used to generate delayed or live video that can be included in the video stream of a computer game. The resulting video stream, optionally includes both rendered images and images recorded using a still or video camera. Video Source 1330 may also include storage devices configured to store previously recorded video to be included in a video stream. Video Source 1330 may also include motion or positioning sensing devices configured to detect motion or position of an object, e.g., person, and logic configured to determine a game state or produce video-based on the detected motion and/or position.

Video Source 1330 is optionally configured to provide overlays configured to be placed on other video. For example, these overlays may include a command interface, log in instructions, messages to a game player, images of other game players, video feeds of other game players (e.g., webcam video). In embodiments of Client 1310A including a touch screen interface or a gaze detection interface, the overlay may include a virtual keyboard, joystick, touch pad, and/or the like. In one example of an overlay a player's voice is overlaid on an audio stream. Video Source 1330 optionally further includes one or more audio sources.

In embodiments wherein Video Server System 1320 is configured to maintain the game state based on input from more than one player, each player may have a different point of view comprising a position and direction of view. Video Source 1330 is optionally configured to provide a separate video stream for each player based on their point of view. Further, Video Source 1330 may be configured to provide a different frame size, frame data size, and/or encoding to each of Client 1310. Video Source 1330 is optionally configured to provide 3-D video.

I/O Device 1345 is configured for Video Server System 1320 to send and/or receive information such as video, commands, requests for information, a game state, gaze information, device motion, device location, user motion, client identities, player identities, game commands, security information, audio, and/or the like. I/O Device 1345 typically includes communication hardware such as a network card or modem. I/O Device 1345 is configured to communicate with Game Server 1325, Network 1315, and/or Clients 1310.

Processor 1350 is configured to execute logic, e.g. software, included within the various components of Video Server System 1320 discussed herein. For example, Processor 1350 may be programmed with software instructions in order to perform the functions of Video Source 1330, Game Server 1325, and/or a Client Qualifier 1360. Video Server System 1320 optionally includes more than one instance of Processor 1350. Processor 1350 may also be programmed with software instructions in order to execute commands received by Video Server System 1320, or to coordinate the operation of the various elements of Game System 1300 discussed herein. Processor 1350 may include one or more hardware device. Processor 1350 is an electronic processor.

Storage 1355 includes non-transitory analog and/or digital storage devices. For example, Storage 1355 may include an analog storage device configured to store video frames. Storage 1355 may include a computer readable digital storage, e.g. a hard drive, an optical drive, or solid state storage. Storage 1315 is configured (e.g. by way of an appropriate data structure or file system) to store video frames, artificial frames, a video stream including both video frames and artificial frames, audio frame, an audio stream, and/or the like. Storage 1355 is optionally distributed among a plurality of devices. In some embodiments, Storage 1355 is configured to store the software components of Video Source 1330 discussed elsewhere herein. These components may be stored in a format ready to be provisioned when needed.

Video Server System 1320 optionally further comprises Client Qualifier 1360. Client Qualifier 1360 is configured for remotely determining the capabilities of a client, such as Clients 1310A or 1310B. These capabilities can include both the capabilities of Client 1310A itself as well as the capabilities of one or more communication channels between Client 1310A and Video Server System 1320. For example, Client Qualifier 1360 may be configured to test a communication channel through Network 1315.

Client Qualifier 1360 can determine (e.g., discover) the capabilities of Client 1310A manually or automatically. Manual determination includes communicating with a user of Client 1310A and asking the user to provide capabilities. For example, in some embodiments, Client Qualifier 1360 is configured to display images, text, and/or the like within a browser of Client 1310A. In one embodiment, Client 1310A is an HMD that includes a browser. In another embodiment, client 1310A is a game console having a browser, which may be displayed on the HMD. The displayed objects request that the user enter information such as operating system, processor, video decoder type, type of network connection, display resolution, etc. of Client 1310A. The information entered by the user is communicated back to Client Qualifier 1360.

Automatic determination may occur, for example, by execution of an agent on Client 1310A and/or by sending test video to Client 1310A. The agent may comprise computing instructions, such as java script, embedded in a web page or installed as an add-on. The agent is optionally provided by Client Qualifier 1360. In various embodiments, the agent can find out processing power of Client 1310A, decoding and display capabilities of Client 1310A, lag time reliability and bandwidth of communication channels between Client 1310A and Video Server System 1320, a display type of Client 1310A, firewalls present on Client 1310A, hardware of Client 1310A, software executing on Client 1310A, registry entries within Client 1310A, and/or the like.

Client Qualifier 1360 includes hardware, firmware, and/or software stored on a computer readable medium. Client Qualifier 1360 is optionally disposed on a computing device separate from one or more other elements of Video Server System 1320. For example, in some embodiments, Client Qualifier 1360 is configured to determine the characteristics of communication channels between Clients 1310 and more than one instance of Video Server System 1320. In these embodiments the information discovered by Client Qualifier can be used to determine which instance of Video Server System 1320 is best suited for delivery of streaming video to one of Clients 1310.

Embodiments of the present disclosure may be practiced with various computer system configurations including hand-held devices, microprocessor systems, microprocessor-based or programmable consumer electronics, minicomputers, mainframe computers and the like. The disclosure can also be practiced in distributed computing environments where tasks are performed by remote processing devices that are linked through a wire-based or wireless network.

With the above embodiments in mind, it should be understood that the disclosure can employ various computer-implemented operations involving data stored in computer systems. These operations are those requiring physical manipulation of physical quantities. Any of the operations described herein that form part of the disclosure are useful machine operations. The disclosure also relates to a device or an apparatus for performing these operations. The apparatus can be specially constructed for the required purpose, or the apparatus can be a general-purpose computer selectively activated or configured by a computer program stored in the computer. In particular, various general-purpose machines can be used with computer programs written in accordance with the teachings herein, or it may be more convenient to construct a more specialized apparatus to perform the required operations.

The disclosure can also be embodied as computer readable code on a computer readable medium. The computer readable medium is any data storage device that can store data, which can be thereafter be read by a computer system. Examples of the computer readable medium include hard drives, network attached storage (NAS), read-only memory, random-access memory, CD-ROMs, CD-Rs, CD-RWs, magnetic tapes and other optical and non-optical data storage devices. The computer readable medium can include computer readable tangible medium distributed over a network-coupled computer system so that the computer readable code is stored and executed in a distributed fashion.

Although the method operations were described in a specific order, it should be understood that other housekeeping operations may be performed in between operations, or operations may be adjusted so that they occur at slightly different times, or may be distributed in a system which allows the occurrence of the processing operations at various intervals associated with the processing, as long as the processing of the overlay operations are performed in the desired way.

Although the foregoing disclosure has been described in some detail for purposes of clarity of understanding, it will be apparent that certain changes and modifications can be practiced within the scope of the appended claims. Accordingly, the present embodiments are to be considered as illustrative and not restrictive, and the disclosure is not to be limited to the details given herein, but may be modified within the scope and equivalents of the present disclosure.

What is claimed is:

1. A method, comprising:

sending, over a network to a client device, game title icons for inclusion in a gaming platform interface rendered to a display device, the game title icons identifying video games that are accessible through the gaming platform interface using the client device;

receiving, over the network from the client device, user selection data indicating selection of a game title icon, and, responsive to the user selection data indicating selection of the game title icon, presenting through the client device options to play a video game corresponding to the game title icon or explore Internet content related to the corresponding video game;

responsive to receiving user selection data indicating selection of the option to explore the Internet content, generating a search query based on the identified video game, transmitting the search query over the network to a search engine, and receiving results of the search query over the network from the search engine, the results identifying Internet content items related to the video game;

generating preview images of at least some of the Internet content items;

further responsive to receiving the user selection data indicating selection of the option to explore the Internet content, sending the preview images to the client device for rendering in association with the identified video game via the gaming platform interface, wherein the preview images are rendered as selectable preview icons, wherein selection of a rendered preview icon provides navigation to a corresponding Internet content item via the gaming platform interface, and wherein rendering the preview icons in association with the identified video game includes moving the game title icon to a center position of a grid configuration and arranging the preview icons in the grid configuration surrounding the game title icon of the identified video game, and wherein the rendering of the preview icons occurs without leaving a context of the gaming platform interface;

predicting a selection of one of the preview icons, and generating a second search query based on the internet content item corresponding to the predicted one of the preview icons, and storing results of the second search query to a cache.

2. The method of claim 1, wherein the video games that are accessible through the gaming platform interface include cloud-executed video games that are accessible for interactive gameplay through the gaming platform interface, the interactive gameplay of a given cloud-executed video game including streaming of video content, generated from execution of the cloud-executed video game by a cloud-based game machine, to the client device for rendering to the display device, and further including processing of input data received from the client device to drive the execution of the cloud-executed video game.

3. The method of claim 1, wherein generating and transmitting the search query includes accessing an application program interface (API) of the search engine.

4. The method of claim 1, wherein the search query includes one or more keywords associated with the video game, the keywords including one or more of a title of the video game, a genre of the video game, a character of the video game, an object of the video game, a developer of the video game, a gameplay mechanic of the video game.

5. The method of claim 1, wherein generating the preview image of a given Internet content item includes accessing a web server to retrieve the given Internet content item, generating a graphic rendering of the given Internet content item, and processing the graphic rendering of the Internet content item to generate the preview image.

6. The method of claim 1, wherein the Internet content items include one or more of a web page, a video, or a social network feed.

7. The method of claim 1, further comprising:
filtering the results based on user preference data that identifies preferred Internet-related activities associated to a user account, the filtered results defining the at least some of the Internet content items for which preview images are generated.

8. The method of claim 1, wherein the grid configuration includes at least three rows and at least three columns for placement of the game title icon and the preview icons, such that the game title icon and the preview icons are aligned along the rows and the columns.

9. A method, comprising:
rendering, by a client device, game title icons in a gaming platform interface, to a display device, the game title icons identifying video games that are accessible through the gaming platform interface using the client device, wherein the video games that are accessible through the gaming platform interface include cloud-executed video games that are accessible for interactive gameplay through the gaming platform interface, the interactive gameplay of a given cloud-executed video game including streaming of video content, generated from execution of the cloud-executed video game by a cloud-based game machine, to the client device for rendering to the display device, and further including processing of input data received from the client device to drive the execution of the cloud-executed video game;
receiving, by the client device, user selection data indicating selection of a game title icon and identifying a corresponding video game for exploration of related Internet content;
generating a search query based on the identified video game, transmitting the search query over the network to a search engine, and receiving results of the search query over the network from the search engine, the results identifying Internet content items related to the video game, the search engine configured to index news content from one or more news sites, the Internet content items including news content items from the one or more news sites;
generating preview images of at least some of the Internet content items, including preview images of at least some of the news content items;
further responsive to receiving the user selection data indicating selection of the game title icon and identifying the corresponding video game for exploration of related Internet content, rendering the preview images in association with the identified video game via the gaming platform interface, wherein the preview images are rendered as selectable preview icons, wherein selection of a rendered preview icon provides navigation to a corresponding Internet content item via the gaming platform interface, wherein rendering the preview icons in association with the identified video game includes moving the game title icon to a center position and arranging the preview icons in a configuration surrounding the game title icon of the identified video game, and wherein the rendering of the preview icons occurs without leaving a context of the gaming platform interface;
predicting a selection of one of the preview icons, and generating a second search query based on the internet content item corresponding to the predicted one of the preview icons, and storing results of the second search query to a cache.

10. The method of claim 9, wherein generating and transmitting the search query includes accessing an application program interface (API) of the search engine.

11. The method of claim 9, wherein the search query includes one or more keywords associated with the video game, the keywords including one or more of a title of the video game, a genre of the video game, a character of the video game, an object of the video game, a developer of the video game, a gameplay mechanic of the video game.

12. The method of claim 9, wherein generating the preview image of a given Internet content item includes accessing a web server to retrieve the given Internet content item, generating a graphic rendering of the given Internet content item, and processing the graphic rendering of the Internet content item to generate the preview image.

13. The method of claim 9, wherein rendering the preview icons in association with the identified video game includes arranging the preview icons in a grid configuration surrounding the game title icon of the identified video game.

14. The method of claim 9, wherein the Internet content items include one or more of a web page, a video, or a social network feed.

15. The method of claim 9, further comprising:
filtering the results based on user preference data that identifies preferred Internet-related activities associated to a user account, the filtered results defining the at least some of the Internet content items for which preview images are generated.

16. The method of claim 9, wherein generating the search query and generating the preview images are performed in advance of receiving the user selection data, based on a prediction of the selection of the game title icon, the preview images being stored to a cache of the client device, and wherein rendering the preview images includes retrieving the preview images from the cache.

17. A method, comprising:
rendering, by a client device, icons in a gaming platform interface, to a display device, the icons identifying content items that are accessible through the gaming platform interface using the client device, wherein the content items that are accessible through the gaming platform interface include cloud-executed video games that are accessible for interactive gameplay through the gaming platform interface, the interactive gameplay of a given cloud-executed video game including streaming of video content, generated from execution of the cloud-executed video game by a cloud-based game machine, to the client device for rendering to the display device, and further including processing of input data received from the client device to drive the execution of the cloud-executed video game;
receiving, by the client device, user selection data indicating selection of an icon and identifying a corresponding content item for exploration of related Internet content;
generating a search query based on the identified content item, transmitting the search query over the network to a search engine, and receiving results of the search query over the network from the search engine, the results identifying Internet content items related to the identified content item;

generating preview images of at least some of the Internet content items;

further responsive to receiving the user selection data indicating selection of the game title icon and identifying the corresponding video game for exploration of related Internet content, rendering the preview images in association with the identified video game via the gaming platform interface, wherein the preview images are rendered as selectable preview icons, wherein selection of a rendered preview icon provides navigation to a corresponding Internet content item via the gaming platform interface, wherein rendering the preview icons in association with the identified video game includes moving the game title icon to a center position and arranging the preview icons in a configuration surrounding the game title icon of the identified video game, wherein the rendering of the preview icons occurs without leaving a context of the gaming platform interface, wherein selection of a preview icon provides access to options to view the corresponding Internet content item of the selected preview icon or select the corresponding Internet content item for further exploration of related Internet content;

predicting a selection of one of the preview icons, and generating a second search query based on the internet content item corresponding to the predicted one of the preview icons, and storing results of the second search query to a cache.

18. The method of claim 17, wherein the content items are selected from the group consisting of video games, videos, and music.

19. The method of claim 17,
wherein generating and transmitting the search query includes accessing an application program interface (API) of the search engine;
wherein the search query includes one or more keywords associated with the content item, the keywords including one or more of a title of the video game, a genre of the video game, a character of the video game, an object of the video game, a developer of the video game, a gameplay mechanic of the video game.

* * * * *